(12) United States Patent
Seguchi

(10) Patent No.: US 11,218,065 B2
(45) Date of Patent: Jan. 4, 2022

(54) FIELD COIL TYPE ROTATING ELECTRIC MACHINE

(71) Applicant: DENSO CORPORATION, Kariya (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 16/881,426

(22) Filed: May 22, 2020

(65) Prior Publication Data

US 2020/0373823 A1 Nov. 26, 2020

(30) Foreign Application Priority Data

May 22, 2019 (JP) .............................. JP2019-096348

(51) Int. Cl.
*H02K 23/66* (2006.01)

(52) U.S. Cl.
CPC ......... *H02K 23/66* (2013.01); *H02K 2213/03* (2013.01)

(58) Field of Classification Search
CPC .. H02K 1/00; H02K 1/16; H02K 1/24; H02K 1/243; H02K 1/26; H02K 3/00; H02K 3/12; H02K 3/28; H02K 3/48; H02K 9/00; H02K 9/22; H02K 11/00; H02K 11/02; H02K 11/028; H02K 11/04; H02K 11/042; H02K 19/00; H02K 19/12; H02K 19/26; H02K 19/28; H02K 19/36; H02K 23/00; H02K 23/66
See application file for complete search history.

(56) References Cited

U.S. PATENT DOCUMENTS

| | | | | |
|---|---|---|---|---|
| 4,458,183 A | * | 7/1984 | Neilson | H02P 7/2913 |
| | | | | 318/139 |
| 6,384,564 B1 | * | 5/2002 | Pollock | H02K 19/06 |
| | | | | 318/701 |
| 2014/0285057 A1 | | 9/2014 | Aoyama | |
| 2015/0194855 A1 | | 7/2015 | Kubo et al. | |
| 2015/0333679 A1 | * | 11/2015 | Box | H02P 25/03 |
| | | | | 310/68 D |
| 2019/0207491 A1 | | 7/2019 | Seguchi | |

FOREIGN PATENT DOCUMENTS

| | | |
|---|---|---|
| JP | S63-144746 A | 6/1988 |
| JP | H7-095790 A | 4/1995 |
| JP | 2008-178211 A | 7/2008 |
| JP | 2018-036461 A | 3/2018 |

* cited by examiner

*Primary Examiner* — Tran N Nguyen
(74) *Attorney, Agent, or Firm* — Oliff PLC

(57) ABSTRACT

A field coil type rotating electric machine includes a rotor where both a series resonant circuit including a first winding and a capacitor and a parallel resonant circuit including a second winding and the capacitor are formed. The first winding is radially located closer than the second winding to a stator. The capacitance of the capacitor and the ratio of the number of turns of the second winding to the number of turns of the first winding are set to have the amplitude of a total resultant magnetic flux lower than the amplitude of a field resultant magnetic flux. The total resultant magnetic flux is the resultant of the field resultant magnetic flux and magnetic flux generated by harmonic currents flowing in phase windings of a stator coil. The field resultant magnetic flux is the resultant of magnetic fluxes generated by harmonic currents flowing in the first and second windings.

6 Claims, 15 Drawing Sheets

$$\left( \begin{array}{l} \cdot f1 = \dfrac{1}{2\pi\sqrt{L1 \times C}} \\ \cdot f2 = \dfrac{1}{2\pi\sqrt{L2 \times C}} \end{array} \right)$$

(a) FUNDAMENTAL CURRENT (b) HARMONIC CURRENT (c) RESULTANT CURRENT

FIG.8
| PATTERN | | 1 | 2 | 3 | 4 |
|---|---|---|---|---|---|
| DIRECTIONS OF INDUCED VOLTAGES | e1 ⌇71a | ↑ | ↓ | ↑ | ↓ |
| | e2 ⌇71b | ↑ | ↑ | ↓ | ↓ |
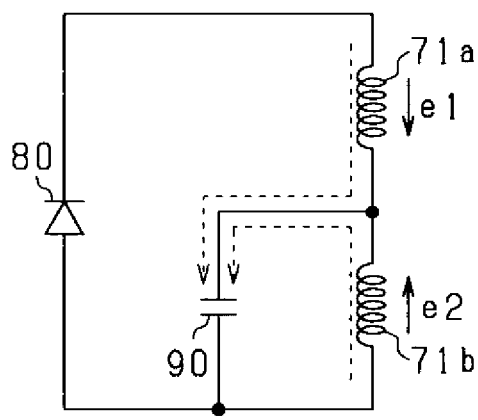
FIG.9A
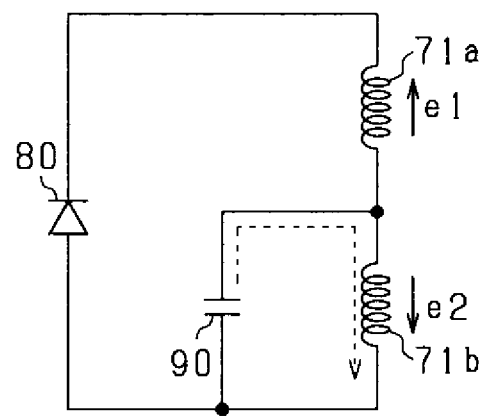
FIG.9B $\phi1 : \phi2 : \phi s = 1 : 0.9 : 1.1$ $\phi1 : \phi2 : \phi s = 1.5 : 0.7 : 1.1$ $\phi1 : \phi2 : \phi s = 0.7 : 1.5 : 1.1$

FIG.15

| CAPACITANCE | | A-LINE | | | | B-LINE | | |
|---|---|---|---|---|---|---|---|---|
| [μF] | [-] | N2/N1 | If[A] | TORQUE [Nm] | TORQUE RIPPLE RATIO [-] | N2/N1 | If[A] | TORQUE [Nm] |
| 15 | 0.6 | 0.5 | 10.4 | 76.1 | 22.5 | | | |
| 20 | 0.8 | 0.7 | 28.1 | 185 | 6.3 | 5.2 | 11 | 80.5 |
| 25 | 1 | 0.9 | 36.6 | 212 | 8.3 | 3.3 | 24.4 | 168 |
| 30 | 1.2 | 1.2 | 35.3 | 209 | 8.6 | 2.3 | 38 | 212 |
| 35 | 1.4 | 1.7 | 42 | 221 | 7.5 | 1.7 | 42 | 221 |
| 40 | 1.6 | 2.3 | 45.6 | 225 | 6.2 | 1.2 | 23.4 | 163 |
| 45 | 1.8 | 3.3 | 41.5 | 217 | 4.7 | 0.9 | 18.2 | 132 |
| 50 | 2.0 | 5.2 | 32.6 | 199 | 4.1 | 0.7 | 15.4 | 112 |
| 55 | 2.2 | 10.2 | 14.5 | 106 | 12 | | | |

N1+N2=Ncst

FIELD COIL TYPE ROTATING ELECTRIC MACHINE

CROSS-REFERENCE TO RELATED APPLICATION

This application is based on and claims priority from Japanese Patent Application No. 2019-096348 filed on May 22, 2019, the contents of which are hereby incorporated by reference in their entirety into this application.

BACKGROUND

1 Technical Field

The present disclosure relates to field coil type rotating electric machines.

2 Description of Related Art

There is known a field coil type rotating electric machine. This machine includes a stator having a stator coil, a field coil including a serially-connected winding pair consisting of first and second windings, a rotor having a rotor core and a plurality of main pole portions, and a diode. The main pole portions are formed, at predetermined intervals in a circumferential direction, to radially protrude from the rotor core. The diode has its cathode connected to a first-winding-side end of the serially-connected winding pair and its anode connected to a second-winding-side end of the serially-connected winding pair. Each of the first and second windings is wound on each of the main pole portions. The stator coil is comprised of a plurality of phase windings. In operation, each of the phase windings of the stator coil is supplied with both fundamental current mainly for generating torque and harmonic current mainly for exciting the field coil.

Upon supply of the harmonic currents to the phase windings of the stator coil, main magnetic flux flows through a magnetic circuit which includes the main pole portions circumferentially adjacent to one another and the rotor core. Consequently, with the main magnetic flux flowing through the magnetic circuit, voltages are induced respectively in the first and second windings that are serially connected with each other, thereby inducing electric currents having harmonic components respectively in the first and second windings. The electric currents induced in the first and second windings are then rectified by the diode to flow in one direction, namely the rectification direction. As a result, field current flows in the field coil in the rectification direction, thereby exciting the field coil.

On the other hand, upon supply of the harmonic currents to the phase windings of the stator coil, leakage magnetic flux is also generated in addition to the main magnetic flux. The leakage magnetic flux flows between each circumferentially-adjacent pair of the main pole portions without flowing through the rotor core, crossing the field coil. Upon the leakage magnetic flux crossing the field coil, the voltages induced respectively in the first and second windings may become opposite in polarity to each other, thereby reducing the sum of the electric currents induced respectively in the first and second windings and thus the field current flowing in the field coil.

To solve the above problem, the known field coil type rotating electric machine further includes a capacitor that is connected in parallel with the second winding. Consequently, both a series resonant circuit including the first winding and the capacitor and a parallel resonant circuit including the second winding and the capacitor are formed, thereby increasing the field current.

SUMMARY

According to the present disclosure, there is provided a field coil type rotating electric machine which includes a stator, a field coil and a rotor. The stator includes a stator coil that is comprised of a plurality of phase windings. The field coil includes a serially-connected winding pair consisting of a first winding and a second winding that are connected in series with each other. The rotor includes a rotor core and a plurality of main pole portions that are formed at predetermined intervals in a circumferential direction and each radially protrude from the rotor core. Each of the first and second windings of the field coil is wound on each of the main pole portions of the rotor. Each of the phase windings of the stator coil is configured to be supplied with harmonic current to induce field current in the field coil. The field coil type rotating electric machine further includes a diode and a capacitor. The diode has its cathode connected to a first-winding-side end of the serially-connected winding pair and its anode connected to a second-winding-side end of the serially-connected winding pair. The capacitor is connected in parallel with the second winding. In the field coil type rotating electric machine, there are formed both a series resonant circuit including the first winding and the capacitor and a parallel resonant circuit including the second winding and the capacitor. The first winding is radially located closer than the second winding to the stator. The capacitance of the capacitor and the turn number ratio, which is the ratio of the number of turns of the second winding to the number of turns of the first winding, are set to have the amplitude of a total resultant magnetic flux lower than the amplitude of a field resultant magnetic flux when the harmonic currents are supplied to the phase windings of the stator coil. The total resultant magnetic flux is the resultant of the field resultant magnetic flux and magnetic flux generated by the harmonic currents flowing in the phase windings of the stator coil. The field resultant magnetic flux is the resultant of magnetic flux generated by harmonic current flowing in the first winding and magnetic flux generated by harmonic current flowing in the second winding.

BRIEF DESCRIPTION OF THE DRAWINGS

FIG. 8 is a table illustrating patterns of voltages induced in first and second windings of a field coil of the field coil type rotating electric machine.

FIGS. 9A and 9B are schematic circuit diagrams illustrating the flow of electric currents induced in the first and second windings of the field coil, the electric currents corresponding to the patterns 2 and 3 shown in FIG. 8.

FIG. 15 is a table illustrating the relationship of field current, torque and torque ripple ratio to the capacitance of a capacitor included in the resonant circuits and the ratio of the number of turns between the first and second windings.

DESCRIPTION OF EMBODIMENTS

Figure 1:
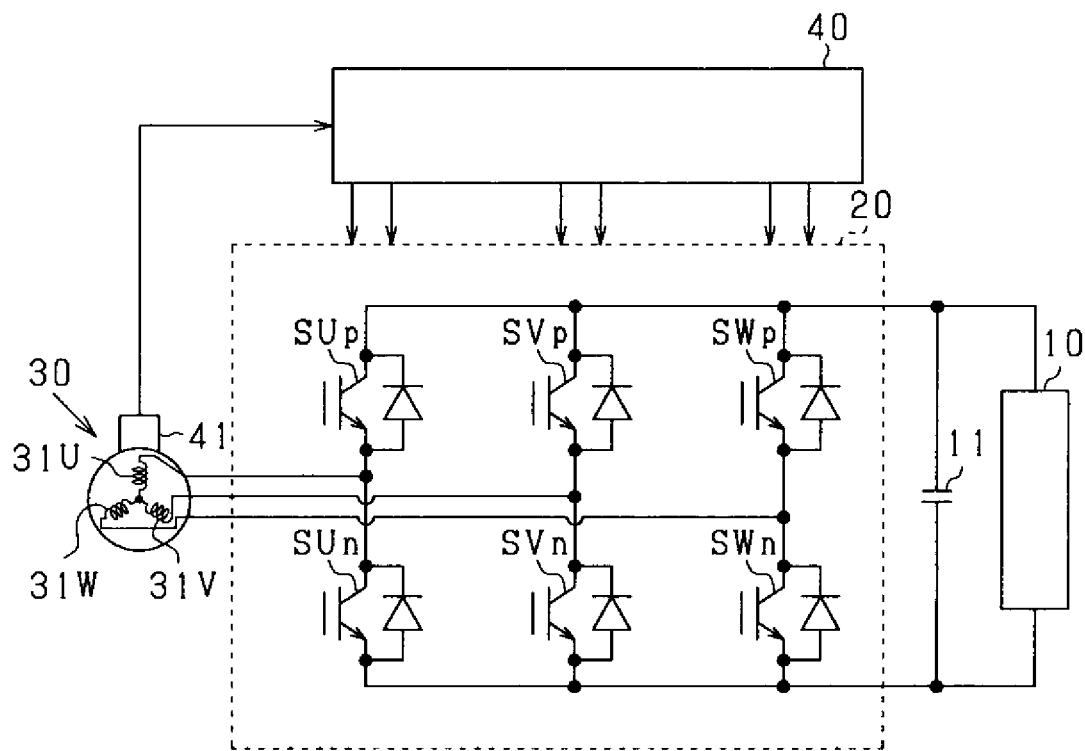
FIG. 1 is an overall configuration diagram of a rotating electric machine system which includes a field coil type rotating electric machine according to a first embodiment.

In the field coil type rotating electric machine known in the art (see, for example, Japanese Patent Application Publication No. JP 2018-042401 A), the harmonic currents supplied to the phase windings of the stator coil cause harmonic currents to flow in the first and second windings. Consequently, magnetic flux is generated by the harmonic currents flowing in the first and second windings. On the other hand, magnetic flux is also generated by the harmonic currents flowing in the phase windings of the stator coil. In this case, the amplitude of resultant magnetic flux, which is the resultant of the magnetic flux generated by the harmonic currents flowing in the first and second windings and the magnetic flux generated by the harmonic currents flowing in the phase windings of the stator coil, may be increased, thereby increasing the torque ripple ratio of the rotating electric machine. Here, the torque ripple ratio denotes the ratio of an amount of variation in the torque of the rotating electric machine to a DC (Direct Current) component of the torque.

In contrast, in the field coil type rotating electric machine according to the present disclosure, upon the harmonic currents flowing in the phase windings of the stator coil, harmonic currents are induced to flow respectively in the first and second windings of the field coil. The difference in phase between the harmonic current flowing in the series resonant circuit including the first winding and the harmonic current flowing in the parallel resonant circuit including the second winding is, for example, larger than 120° and smaller than 240°. Moreover, with change in the turn number ratio, both the amplitude of the magnetic flux generated by the harmonic current flowing in the first winding and the amplitude of the magnetic flux generated by the harmonic current flowing in the second winding change. Consequently, the amplitude of the field resultant magnetic flux also changes; the field resultant magnetic flux is the resultant of the magnetic flux generated by the harmonic current flowing in the first winding and the magnetic flux generated by the harmonic current flowing in the second winding. Furthermore, with change in the amplitude of the field resultant magnetic flux, the amplitude of the total resultant magnetic flux also changes; the total resultant magnetic flux is the resultant of the field resultant magnetic flux and the magnetic flux generated by the harmonic currents flowing in the phase windings of the stator coil. That is, the amplitude of the total resultant magnetic flux can be made lower than the amplitude of the field resultant magnetic flux by changing the turn number ratio. In view of the above, in the field coil type rotating electric machine according to the present disclosure, the capacitance of the capacitor and the turn number ratio are set so that when the harmonic currents are supplied to the phase windings of the stator coil, the amplitude of the total resultant magnetic flux becomes lower than the amplitude of the field resultant magnetic flux. Consequently, it becomes possible to lower the torque ripple ratio of the rotating electric machine.

In a further implementation, the turn number ratio is set to be higher than or equal to 0.5 and lower than or equal to 5.2 with the capacitance of the capacitor set to be in a predetermined range under the constraint of keeping the resonance frequency of the series resonant circuit at a predetermined frequency and the turn number sum, which is the sum of the number of turns of the first winding and the number of turns of the second winding, at a predetermined turn number. In other words, the resonance frequency of the series resonant circuit is set to the predetermined frequency by setting the capacitance of the capacitor to be in the predetermined range and the turn number ratio to be higher than or equal to 0.5 and lower than or equal to 5.2. In addition, upon the setting of the resonance frequency of the series resonant circuit, the resonance frequency of the parallel resonant circuit is also set accordingly.

More specifically, to keep the resonance frequency of the series resonant circuit including the first winding at the predetermined frequency under the constraint of keeping the turn number sum at the predetermined turn number, it is necessary to set the capacitance of the capacitor and the turn number ratio such that the higher the capacitance of the capacitor, the higher the turn number ratio. The inventor of the present application has confirmed, through experimental investigation, that when the capacitance of the capacitor is varied in the predetermined range under the constraint of keeping the resonance frequency of the series resonant circuit at the predetermined frequency and the turn number sum at the predetermined turn number (hereinafter, to be referred to as the first constraint), the turn number ratio falls within the range of 0.5 to 5.2. Moreover, the inventor has also confirmed, through experimental investigation, that the torque of the rotating electric machine can be kept high by setting the turn number ratio to be in the range of 0.5 to 5.2 under the first constraint.

On the other hand, to keep the resonance frequency of the parallel resonant circuit including the second winding at the predetermined frequency under the constraint of keeping the turn number sum at the predetermined turn number, it is necessary to set the capacitance of the capacitor and the turn number ratio such that the higher the capacitance of the capacitor, the lower the turn number ratio. The inventor has confirmed, through experimental investigation, that: in the case of setting the turn number ratio to be in the range of 0.7 to 5.2 under the constraint of keeping the resonance frequency of the parallel resonant circuit at the predetermined frequency and the turn number sum at the predetermined turn number (hereinafter, to be referred to as the second constraint), the torque of the rotating electric machine becomes highest when the turn number ratio is equal to an intermediate value in the range; with the turn number ratio deviating from the intermediate value, the torque of the rotating electric machine considerably drops. Moreover, the inventor has also confirmed, through experimental investigation, that when the turn number ratio is set to be in the range of 0.5 to 5.2, the torque of the rotating electric machine tends to be lower under the second constraint than under the first constraint. This is because the first winding is radially located closer than the second winding to the stator and thus more susceptible than the second winding to the magnetic flux generated by the harmonic currents flowing in the phase windings of the stator coil.

Accordingly, the torque of the rotating electric machine can be kept higher by setting the capacitance of the capacitor and the turn number ratio under the first constraint pertaining to the series resonant circuit than under the second constraint pertaining to the parallel resonant circuit. Moreover, under the first constraint, the capacitance of the capacitor can be set within the predetermined range and the turn number ratio can be set within the range of 0.5 to 5.2; therefore, the degree of freedom of setting the capacitance of the capacitor and the turn number ratio is improved.

In view of the above, in the further implementation, the resonance frequency of the series resonant circuit is set to the predetermined frequency by setting the capacitance of the capacitor to be in the predetermined range and the turn number ratio to be in the range of 0.5 to 5.2. Consequently, it becomes possible to improve the degree of freedom of setting the capacitance of the capacitor and the turn number ratio to keep the torque of the rotating electric machine high. For example, the turn number ratio may be set to be in the range of 0.7 to 5.2. In this case, it is possible to effectively lower the torque ripple ratio while keeping the torque of the rotating electric machine high.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine system which includes a field coil type rotating electric machine 30 according to the first embodiment.

As shown in FIG. 1, the rotating electric machine system further includes a DC power supply 10, an inverter 20 and a controller 40 in addition to the rotating electric machine 30.

The rotating electric machine 30 is a field coil type synchronous rotating electric machine. More particularly, in the present embodiment, the controller 40 controls the rotating electric machine 30 to function as an ISG (Integrated Starter Generator) or an MG (Motor Generator). In addition, the rotating electric machine 30, the inverter 20 and the controller 40 may be either integrated into a single drive apparatus or be configured as individual components.

Figure 2:
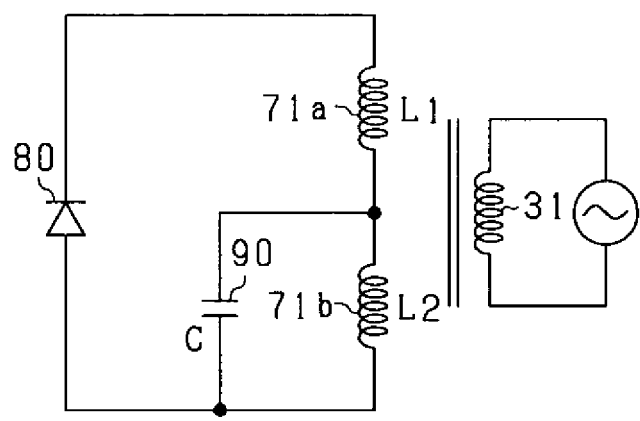
FIG. 2 is a configuration diagram of resonant circuits formed in the field coil type rotating electric machine.
Figure 3:
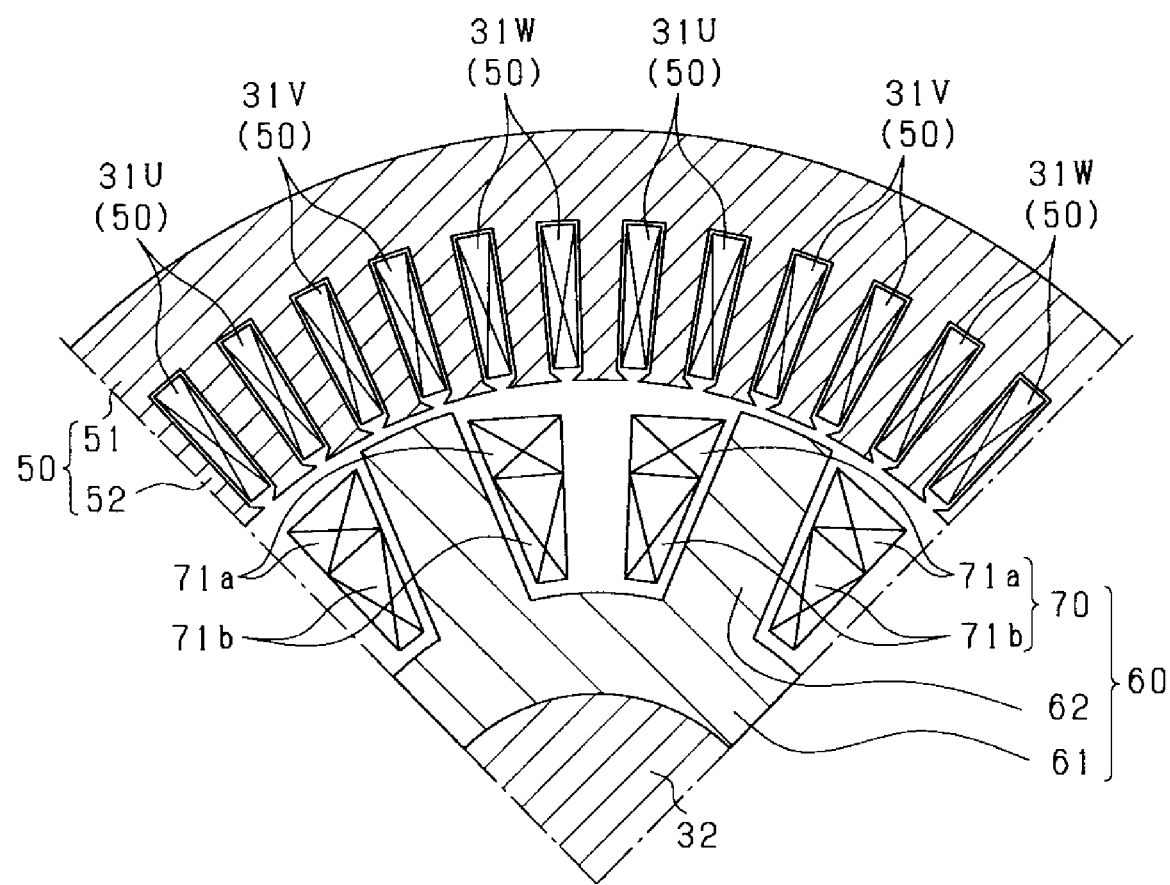
FIG. 3 is a transverse cross-sectional view of both part of a rotor and part of a stator of the field coil type rotating electric machine.

As shown in FIG. 3, the rotating electric machine 30 includes a rotor 60 having a field coil 70. In the present embodiment, as shown in FIGS. 2 and 3, the field coil 70 is constituted of a serially-connected winding pair consisting of a first winding 71a and a second winding 71b that are connected in series with each other. The field coil 70 is formed by, for example, compression shaping to improve the space factor and the assemblability thereof. Moreover, the field coil 70 is formed, for example, of aluminum wires. The specific gravity of aluminum wires is relatively low. Therefore, forming the field coil 70 with aluminum wires, it is possible to lower the centrifugal force during rotation of the rotor 60. Moreover, aluminum wires are lower in both strength and hardness than copper wires. Therefore, aluminum wires are suitable for being compression-shaped.

The rotating electric machine 30 also includes a stator 50 having a stator coil 31. The stator coil 31 is formed, for example, of copper wires. As shown in FIGS. 1 and 3, the stator coil 31 includes a U-phase winding 31U, a V-phase winding 31V and a W-phase winding 31W, which are arranged to be offset from each other by 120° in electrical angle.

As shown in FIG. 1, the inverter 20 includes a serially-connected U-phase switch pair consisting of a U-phase upper-arm switch SUp and a U-phase lower-arm switch SUn, a serially-connected V-phase switch pair consisting of a V-phase upper-arm switch SVp and a V-phase lower-arm switch SVn, and a serially-connected W-phase switch pair consisting of a W-phase upper-arm switch SWp and a W-phase lower-arm switch SWn.

To a junction point between the U-phase upper-arm and lower-arm switches SUp and SUn, there is connected a first end of the U-phase winding 31U of the stator coil 31. To a junction point between the V-phase upper-arm and lower-arm switches SVp and SVn, there is connected a first end of the V-phase winding 31V of the stator coil 31. To a junction point between the W-phase upper-arm and lower-arm switches SWp and SWn, there is connected a first end of the W-phase winding 31W of the stator coil 31. A second end of the U-phase winding 31U, a second end of the V-phase winding 31V and a second end of the W-phase winding 31W are connected together to defined a neutral point therebetween. That is, in the present embodiment, the U-phase, V-phase and W-phase windings 31U, 31V and 31W of the stator coil 31 are star-connected.

In addition, in the present embodiment, each of the switches SUp, SVp, SWp, SUn, SVn and SWn is implemented by an IGBT (Insulated-Gate Bipolar Transistor). Moreover, each of the switches SUp, SVp, SWp, SUn, SVn and SWn has a freewheeling diode connected in antiparallel thereto.

Each of the U-phase, V-phase and W-phase upper-arm switches SUp, SVp and SWp has its collector connected to a positive terminal of the DC power supply 10. Each of the U-phase, V-phase and W-phase lower-arm switches SUn, SVn and SWn has its emitter connected to a negative terminal of the DC power supply 10. In addition, a smoothing capacitor 11 is connected in parallel with the DC power supply 10.

The rotating electric machine system further includes an angle detection unit 41. The angle detection unit 41 is configured to output an angle signal indicative of a rotation angle of the rotor 60 of the rotating electric machine 30. The angle signal outputted from the angle detection unit 41 is inputted to the controller 40.

Next, the configuration of the stator 50 and the rotor 60 of the rotating electric machine 30 will be described in detail with reference to FIGS. 2 and 3. As shown in FIG. 3, both the stator 50 and the rotor 60 are arranged coaxially with a rotating shaft 32. Hereinafter, the direction in which a central axis of the rotating shaft 32 extends will be referred to as the axial direction; the directions of extending radially from the central axis of the rotating shaft 32 will be referred to as radial directions; and the direction of extending along a circle whose center is on the central axis of the rotating shaft 32 will be referred to as the circumferential direction.

The stator 50 is formed by laminating a plurality of soft-magnetic steel sheets in the axial direction. The stator 50 has an annular stator core 51 and a plurality of teeth 52 which each protrude radially inward from the stator core 51 and are spaced at equal intervals in the circumferential direction. Between each circumferentially-adjacent pair of the teeth 52, there is formed one slot. More particularly, in the present embodiment, the number of teeth 52 is set to 48; accordingly, the number of the slots is also equal to 48. In addition, each of the U-phase, V-phase and W-phase windings 31U, 31V and 31W of the stator coil 31 is wound on the teeth 52 in a distributed winding manner or a concentrated winding manner.

The rotor 60 is also formed by laminating a plurality of soft-magnetic steel sheets in the axial direction. The rotor 60 has a cylindrical rotor core 61 and a plurality of main pole portions 62 which each protrude radially outward from the rotor core 61 and are spaced at equal intervals in the circumferential direction. Distal end surfaces (or radially outer end surfaces) of the main pole portions 62 radially face distal end surfaces (or radially inner end surfaces) of the teeth 52 of the stator 50. More particularly, in the present embodiment, the number of the main pole portions 62 is set to 8.

On each of the main pole portions 62 of the rotor 60, the first winding 71a of the field coil 70 is wound on the radially outer side (i.e., the stator side) while the second winding 71b of the field coil 70 is wound on the radially inner side (i.e., the non-stator side). That is, the first winding 71a is located closer to the stator 50 (i.e., more radially outward) than the second winding 71b is. Moreover, on each of the main pole portions 62, the first and second windings 71a and 71b are wound in the same direction. Furthermore, for each circumferentially-adjacent pair of the main pole portions 62, the winding direction of the first and second windings 71a and 71b on one of the main pole portions 62 of the circumferentially-adjacent pair is opposite to the winding direction of the first and second windings 71a and 71b on the other of the main pole portions 62 of the circumferentially-adjacent pair. Consequently, the magnetization directions of the main pole portions 62 of the circumferentially-adjacent pair are opposite to each other.

FIG. 2 shows an electric circuit formed in the rotor 60 that has the first and second windings 71a and 71b of the field coil 70 wound on the same main pole portions 62. In the rotor 60, there are provided a diode 80 as a rectifying element and a capacitor 90. A first end of the first winding 71a (or the first-winding-side end of the serially-connected winding pair) is connected with the cathode of the diode 80. A second end of the first winding 71a is connected with a first end of the second winding 71b. A second end of the second winding 71b (i.e., the second-winding-side end of the serially-connected winding pair) is connected with the anode of the diode 80. The capacitor 90 is connected in parallel with the second winding 71b. In addition, in FIG. 2, L1 represents the inductance of the first winding 71a; L2 represents the inductance of the second winding 71b; and C represents the capacitance of the capacitor 90.

Next, the controller 40 will be described in detail. It should be noted that part or the whole of each function of the controller 40 may be realized either by hardware such as one or more integrated circuits or by software recorded on a non-transitory tangible recording medium and a computer executing the software.

The controller 40 acquires the angle signal outputted from the angle detection unit 41. Then, based on the acquired angle signal, the controller 40 generates drive signals for turning on/off the switches SUp, SVp, SWp, SUn, SVn and SWn of the inverter 20.

Specifically, when driving the rotating electric machine 30 to function as an electric motor, to convert DC power outputted from the DC power supply 10 into AC power and supply the resultant AC power to the U-phase, V-phase and W-phase windings 31U, 31V and 31W, the controller 40 generates drive signals for turning on/off the switches SUp, SVp, SWp, SUn, SVn and SWn and outputs the generated drive signals to the gates of the switches SUp, SVp, SWp, SUn, SVn and SWn. Moreover, when driving the rotating electric machine 30 to function as an electric generator, to convert AC power outputted from the U-phase, V-phase and W-phase windings 31U, 31V and 31W into DC power and supply the resultant DC power to the DC power supply 10, the controller 40 generates drive signals for turning on/off the switches SUp, SVp, SWp, SUn, SVn and SWn and outputs the generated drive signals to the gates of the switches SUp, SVp, SWp, SUn, SVn and SWn.

Figure 4:
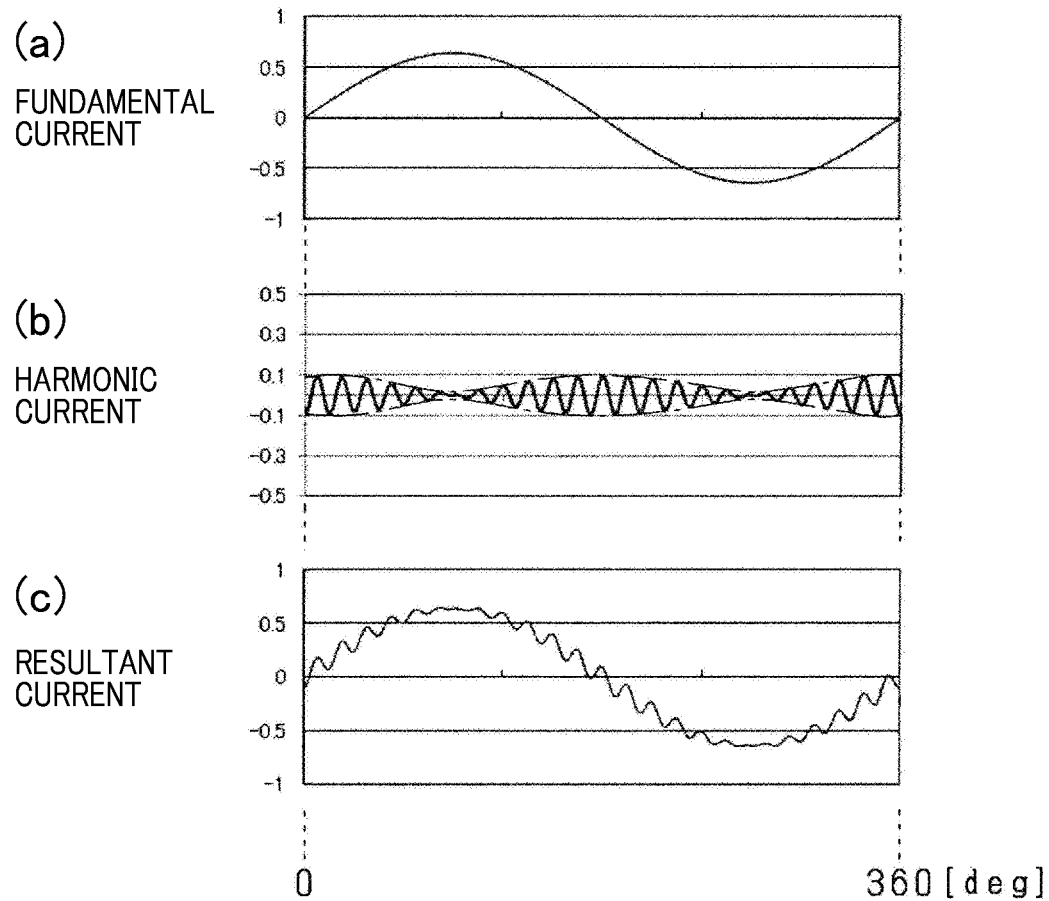
FIG. 4 is a waveform chart illustrating the waveforms of fundamental current, harmonic current and resultant current supplied to each phase winding of a stator coil of the stator according to the first embodiment.

In the present embodiment, the controller 40 turns on/off the switches SUp, SVp, SWp, SUn, SVn and SWn of the inverter 20 to supply each of the U-phase, V-phase and W-phase windings 31U, 31V and 31W with resultant current which is the resultant of fundamental current and harmonic current. As shown in FIG. 4(a), the fundamental current is electric current mainly for causing the rotating electric machine 30 to generate torque. As shown in FIG. 4(b), the harmonic current is electric current mainly for exciting the field coil 70. As shown in FIG. 4(c), the resultant current is the resultant of the fundamental current and the harmonic current and supplied as phase current to each of the U-phase, V-phase and W-phase windings 31U, 31V and 31W. In addition, the vertical axis in FIG. 4 is graduated to indicate the relationship in magnitude between the fundamental current, the harmonic current and the resultant current. It should be noted that the harmonic current may alternatively have a triangular waveform.

Figure 5:
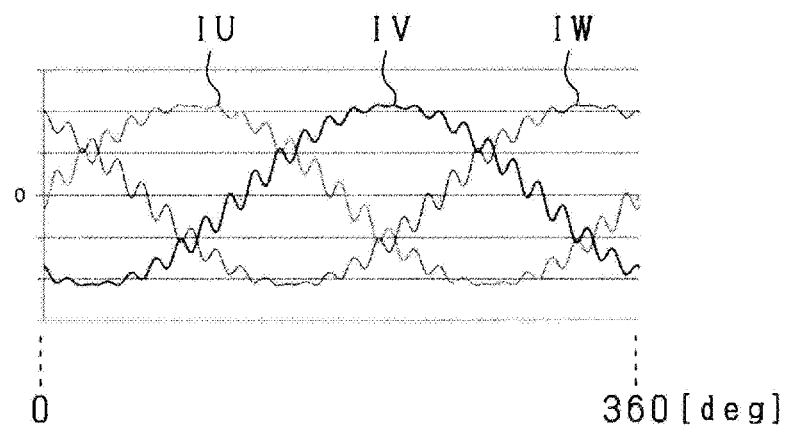
FIG. 5 is a waveform chart illustrating the waveform of three-phase alternating current supplied to the stator coil according to the first embodiment.

As shown in FIG. 5, U-phase, V-phase and W-phase currents IU, IV and IW, which are supplied respectively to the U-phase, V-phase and W-phase windings 31U, 31V and 31W, are offset in phase from each other by 120° in electrical angle.

In the present embodiment, as shown in FIGS. 4(a) and (b), the period of the envelope of the harmonic current is set to be ½ of the period of the fundamental current. The envelope of the harmonic current is designated by a one-dot chain line in FIG. 4(b). Moreover, the timings at which the envelope of the harmonic current reaches its peak values are offset from the timings at which the fundamental current reaches its peak values. More specifically, the timings at which the envelope of the harmonic current reaches its peak values coincide with the timings at which the fundamental current reaches its center of variation (i.e., 0). The controller 40 controls the amplitude and period of each of the fundamental current and the harmonic current severally.

By superimposing the harmonic current shown in FIG. 4(b) on the fundamental current shown in FIG. 4(a), it is possible to suppress increase in the maximum values of the phase currents flowing respectively in the U-phase, V-phase and W-phase windings 31U, 31V and 31W and thus possible to bring the torque of the rotating electric machine 30 into agreement with a command torque without increasing the capacity of the inverter 20.

Figure 6:
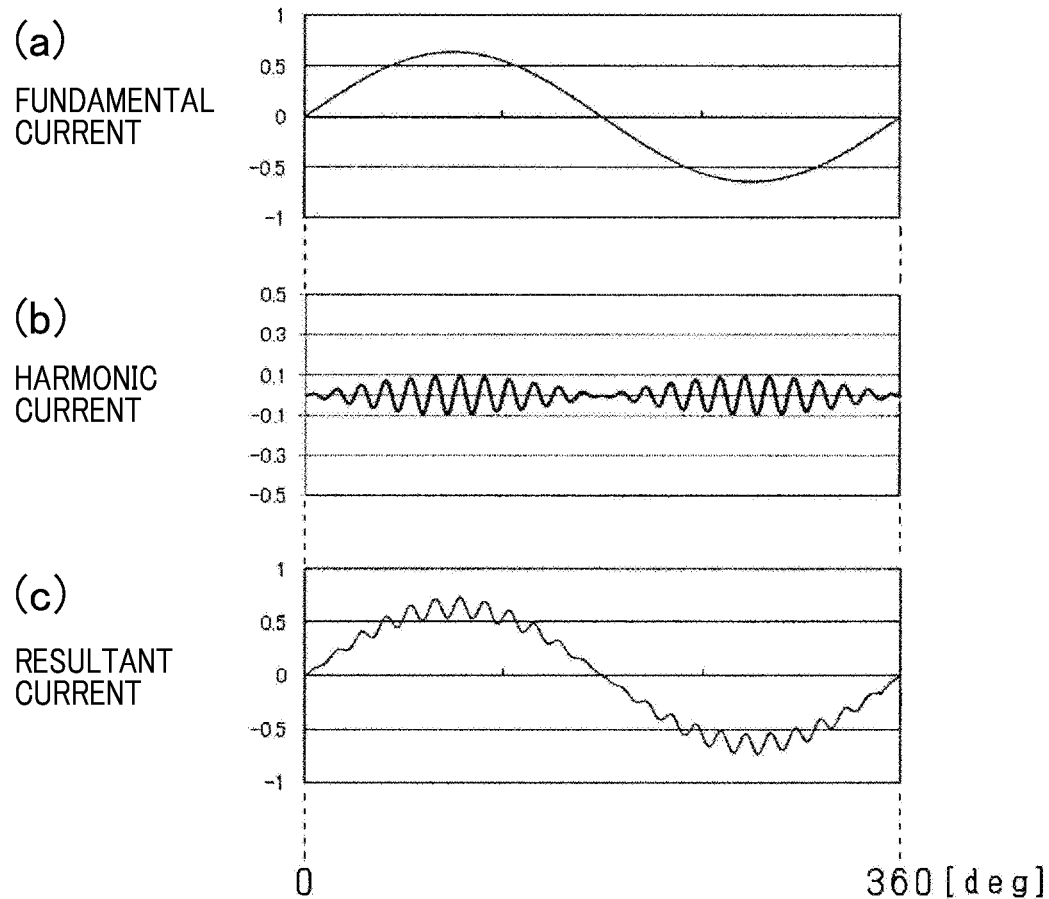
FIG. 6 is a waveform chart illustrating the waveforms of fundamental current, harmonic current and resultant current supplied to each phase winding of the stator coil according to a modification.
Figure 7:
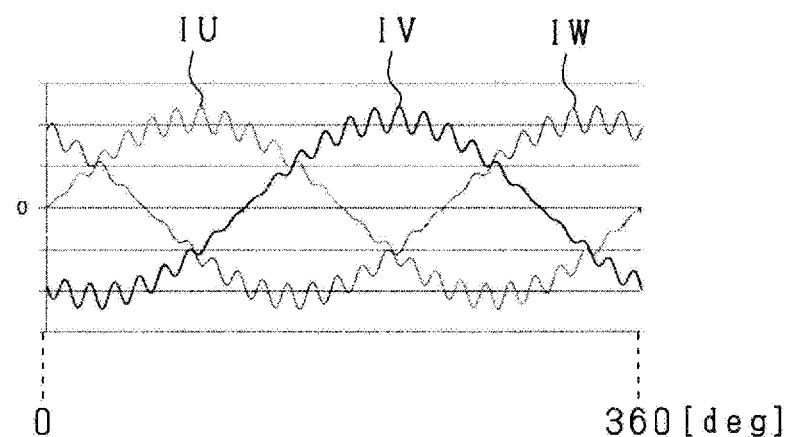
FIG. 7 is a waveform chart illustrating the waveform of three-phase alternating current supplied to the stator coil according to the modification shown in FIG. 6.

As an alternative, harmonic current shown in FIG. 6(b) may be applied instead of the harmonic current shown in FIG. 4(b). The fundamental current shown in FIG. 6(a) is identical to the fundamental current shown in FIG. 4(a). The harmonic current shown in FIG. 6(b) is offset in phase from the harmonic current shown in FIG. 4(b) by ¼ of the period of the fundamental current. The resultant current shown in FIG. 6(c) is the resultant of the fundamental current shown in FIG. 6(a) and the harmonic current shown in FIG. 6(b). In this case, as shown in FIG. 6(a) (b), the timings at which the envelope of the harmonic current reaches its peak values coincide with the timings at which the fundamental current reaches its peak values. Moreover, in this case, the U-phase, V-phase and W-phase currents IU, IV and IW, which are supplied respectively to the U-phase, V-phase and W-phase windings 31U, 31V and 31W, are as shown in FIG. 7. In addition, it is also possible to apply harmonic current whose phase is between the phase of the harmonic current shown in FIG. 4(b) and the phase of the harmonic current shown in FIG. 6(b).

In the present embodiment, the first winding 71a of the field coil 70, the capacitor 90 and the diode 80 together form a series resonant circuit. The series resonant circuit has a resonance frequency which will be referred to as the first resonance frequency f1 hereinafter. The first resonance frequency f1 can be calculated based on the inductance L1 of the first winding 71a and the capacitance C of the capacitor 90 by the following equation (eq1). Moreover, the second winding 71b of the field coil 70 and the capacitor 90 together form a parallel resonant circuit. The parallel resonant circuit has a resonance frequency which will be referred to as the second resonance frequency f2 hereinafter. The second resonance frequency f2 can be calculated based on the inductance L2 of the second winding 71b and the capacitance C of the capacitor 90 by the following equation (eq2).

$$f1 = \frac{1}{2\pi\sqrt{L1 \cdot C}} \quad \text{(eq1)}$$

$$f2 = \frac{1}{2\pi\sqrt{L2 \cdot C}} \quad \text{(eq2)}$$

Upon the harmonic current flowing in each of the U-phase, V-phase and W-phase windings 31U, 31V and 31W, the main magnetic flux varies due to harmonics; the main magnetic flux flows through a magnetic circuit that includes the main pole portions 62 circumferentially adjacent to one another, the rotor core 61, the teeth 52 and the stator core 51. With the variation in the main magnetic flux, voltages are induced respectively in the first and second windings 71a and 71b, thereby inducing electric currents respectively in the first and second windings 71a and 71b. Moreover, when the voltages induced respectively in the first and second windings 71a and 71b are of the same polarity as in the patterns 1 and 4 shown in FIG. 8, the electric currents induced respectively in the first and second windings 71a and 71b are not cancelled by each other, thus increasing the total electric current induced in the field coil 70. Furthermore, the electric currents induced respectively in the first and second windings 71a and 71b are rectified by the diode 80 to flow in one direction, namely the rectification direction. Consequently, field current flows in the field coil 70 in the rectification direction, thereby exciting the field coil 70. In addition, in FIG. 8, e1 represents the voltage induced in the first winding 71a; and e2 represents the voltage induced in the second winding 71b.

On the other hand, upon the harmonic current flowing in each of the U-phase, V-phase and W-phase windings 31U, 31V and 31W, leakage magnetic flux is also generated in addition to the main magnetic flux. The leakage magnetic flux flows between each circumferentially-adjacent pair of the main pole portions 62 without flowing through the rotor core 61, crossing the field coil 70. Upon the leakage magnetic flux crossing the field coil 70, the voltages induced respectively in the first and second windings 71a and 71b may become opposite in polarity to each other, thereby reducing the sum of the electric currents induced respectively in the first and second windings 71a and 71b and thus the field current flowing in the field coil 70.

To solve the above problem, in the present embodiment, the capacitor 90 is connected in parallel with the second winding 71b. Consequently, when the voltages induced respectively in the first and second windings 71a and 71b are opposite in polarity to each other as in the patterns 2 and 3 shown in FIG. 8, the electric currents induced in the first and second windings 71a and 71b flow via the capacitor 90, without being canceled by each other. More specifically, as shown in FIG. 9A, both the electric current induced in the first winding 71a and the electric current induced in the second winding 71b may flow to the anode of the diode 80 via the capacitor 90. Otherwise, as shown in FIG. 9B, electric current may flow from the capacitor 90 to the anode of the diode 80 via the second winding 71b. As a result, it becomes possible to increase the field current flowing in the field coil 70.

Moreover, a further investigation of the patterns 2 and 3 shown in FIG. 8 has been made by the inventor of the present application. The results of the investigation will be described hereinafter.

Figure 10:
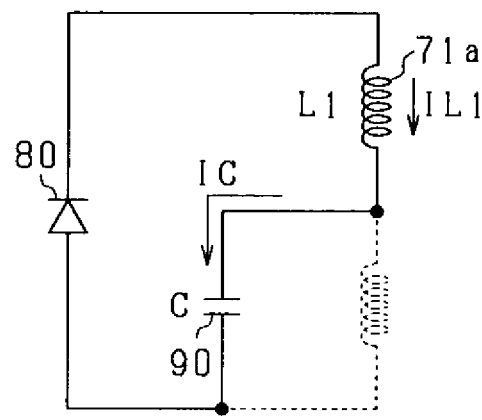
FIG. 10 is a schematic circuit diagram illustrating a series resonant circuit formed in the field coil type rotating electric machine.
Figure 11:
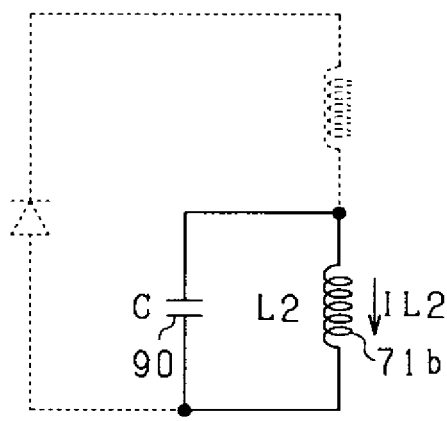
FIG. 11 is a schematic circuit diagram illustrating a parallel resonant circuit formed in the field coil type rotating electric machine.
Figure 12:
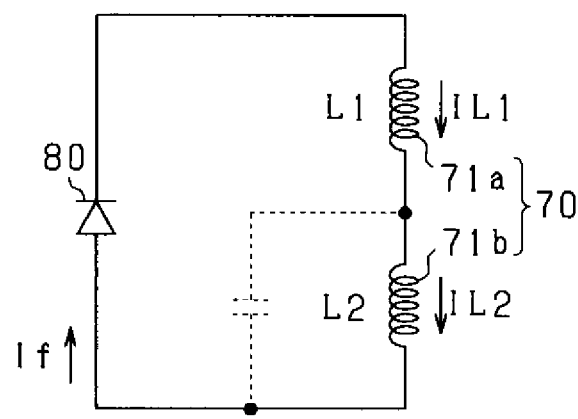
FIG. 12 is a schematic circuit diagram illustrating a rectification circuit formed in the field coil type rotating electric machine.

The electric circuit shown in FIG. 2 basically includes three sub-circuits as shown in FIGS. 10-12. The sub-circuit shown in FIG. 10 is the series resonant circuit that is formed of the first winding 71a, the capacitor 90 and the diode 80. The sub-circuit shown in FIG. 11 is the parallel resonant circuit that is formed of the second winding 71b and the capacitor 90. The sub-circuit shown in FIG. 12 is a rectification circuit that is formed of the first winding 71a, the second winding 71b and the diode 80.

In the series resonant circuit shown in FIG. 10, at the first resonance frequency f1, the impedance becomes lowest and the alternating current becomes highest. Moreover, due to the diode 80 included in the series resonant circuit, half-wave current flows in the series resonant circuit. On the other hand, in the parallel resonant circuit shown in FIG. 11, at the second resonance frequency f2, the impedance becomes lowest and the alternating current becomes highest.

In the series resonant circuit, the electric current, which varies at the first resonance frequency f1, is supplied to the capacitor 90. The electric current supplied to the capacitor 90 is then half-wave rectified by the diode 80 into the half-wave current. In addition, in the series resonant circuit, the electric current, which is blocked by the diode 80, returns to the anode of the diode 80 via the second winding 71b included in the parallel resonant circuit.

The inventor of the present application has found that the torque ripple ratio of the rotating electric machine 30 can be lowered by suitably setting the capacitance C of the capacitor 90 and the ratio of the number of turns N2 of the second winding 71b to the number of turns N1 of the first winding 71a (hereinafter, to be referred to as the turn number ratio N2/N1). In the present embodiment, the torque ripple ratio denotes the ratio ($\Delta$Tr/Tdc) of an amount of variation $\Delta$Tr/2 in the torque of the rotating electric machine 30 to a DC component Tdc of the torque. The findings by the inventor will be described in detail hereinafter.

Upon the harmonic currents flowing in the phase windings 31U-31W of the stator coil 31, harmonic currents, which vary at the same frequency as the harmonic currents flowing in the phase windings 31U-31W of the stator coil 31, are induced to flow respectively in the first and second windings 71a and 71b of the field coil 70. The difference in phase between the harmonic current flowing in the series resonant circuit including the first winding 71a and the harmonic current flowing in the parallel resonant circuit including the second winding 71b is, for example, larger than 120° and smaller than 240°.

With change in the turn number ratio N2/N1, both the amplitude of first magnetic flux $\phi$1 and the amplitude of second magnetic flux $\phi$2 change. Here, the first magnetic flux $\phi$1 denotes magnetic flux generated by the harmonic current flowing in the first winding 71a; and the second magnetic flux $\phi$2 denotes magnetic flux generated by the harmonic current flowing in the second winding 71b. Consequently, the amplitude of field resultant magnetic flux $\phi$rt, which is the resultant of the first magnetic flux $\phi$1 and the second magnetic flux $\phi$2, also changes.

Figure 13A:
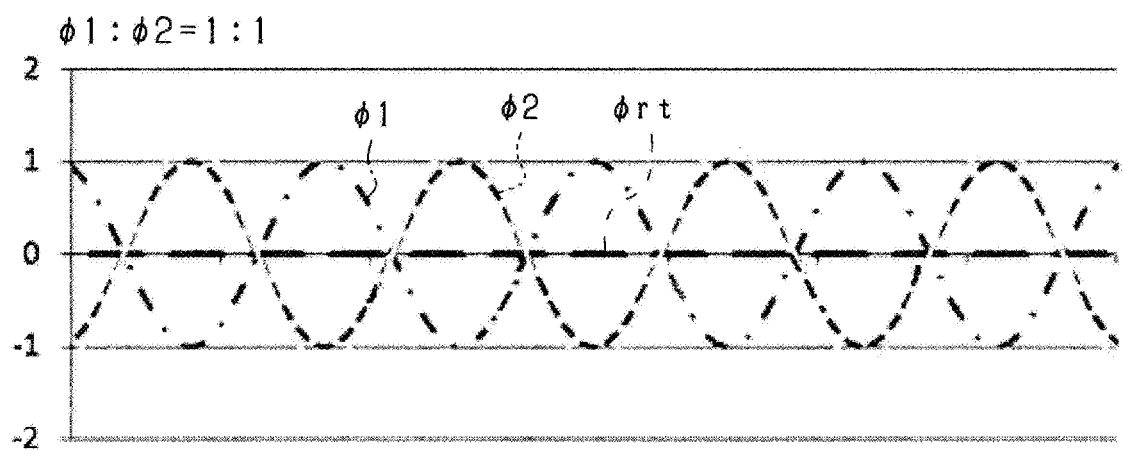
FIGS. 13A, 13B and 13C are waveform charts illustrating the waveforms of first magnetic flux $\phi 1$, second magnetic flux $\phi 2$ and field resultant magnetic flux $\phi rt$ at different ratios of amplitude between $\phi 1$ and $\phi 2$.
Figure 13B:
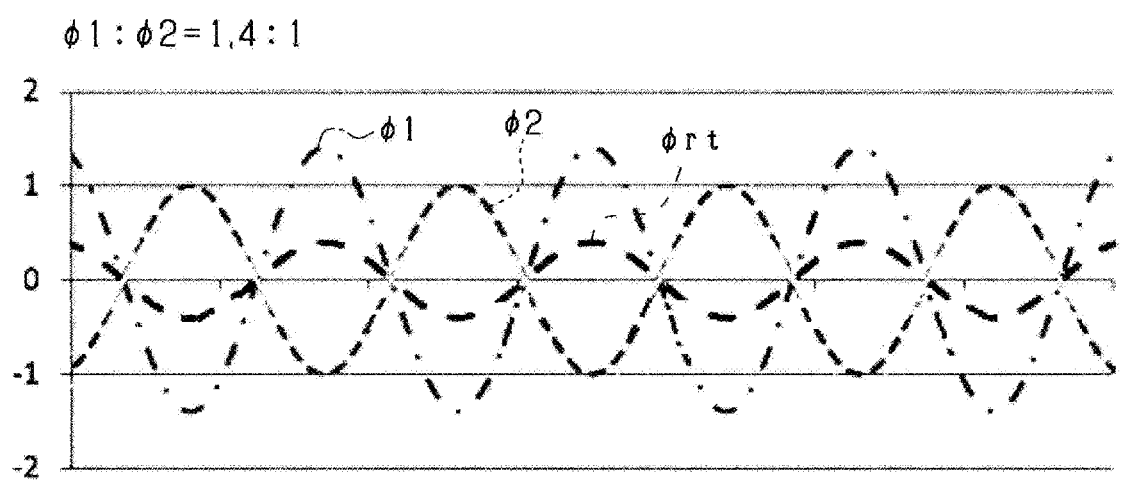
Figure 13C:
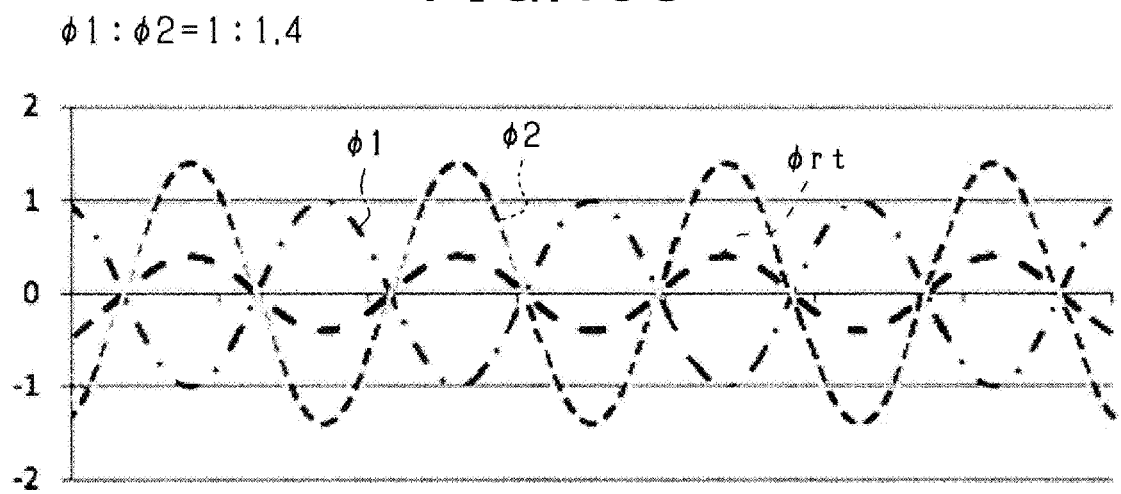

FIGS. 13A-13C show the waveforms of the first magnetic flux $\phi$1, the second magnetic flux $\phi$2 and the field resultant magnetic flux $\phi$rt at different ratios of amplitude between $\phi$1 and $\phi$2. The ratio of amplitude between $\phi$1 and $\phi$2 can be changed by changing the turn number ratio N2/N1. In the examples shown in FIGS. 13A-13C, the difference in phase between the first magnetic flux $\phi$1 and the second magnetic flux $\phi$2 is equal to 180°. In addition, in FIGS. 13A-13C, the vertical axes are graduated to indicate the relationship in magnitude between the magnetic fluxes $\phi$1, $\phi$2 and $\phi$rt.

FIG. 13A shows the waveforms of the first magnetic flux $\phi$1, the second magnetic flux $\phi$2 and the field resultant magnetic flux $\phi$rt when the ratio of amplitude between $\phi$1 and $\phi$2 is equal to 1:1. In the example shown in FIG. 13A, since the amplitude of the first magnetic flux $\phi$1 is equal to the amplitude of the second magnetic flux $\phi$2, the field resultant magnetic flux $\phi$rt has only a DC component.

FIG. 13B shows the waveforms of the first magnetic flux $\phi$1, the second magnetic flux $\phi$2 and the field resultant magnetic flux $\phi$rt when the ratio of amplitude between $\phi$1 and $\phi$2 is equal to 1.4:1. In the example shown in FIG. 13B, since the amplitude of the first magnetic flux $\phi$1 is higher than the amplitude of the second magnetic flux $\phi$2, the field resultant magnetic flux $\phi$rt varies in phase with the second magnetic flux $\phi$2.

FIG. 13C shows the waveforms of the first magnetic flux $\phi$1, the second magnetic flux $\phi$2 and the field resultant magnetic flux $\phi$rt when the ratio of amplitude between $\phi$1 and $\phi$2 is equal to 1:1.4. In the example shown in FIG. 13C, since the amplitude of the second magnetic flux $\phi$2 is higher than the amplitude of the first magnetic flux $\phi$1, the field resultant magnetic flux $\phi$rt varies in phase with the first magnetic flux $\phi$1.

With change in the amplitude of the field resultant magnetic flux $\phi$rt, the amplitude of total resultant magnetic flux $\phi$total, which is the resultant of stator-side magnetic flux $\phi$s and the field resultant magnetic flux $\phi$rt, also changes. Here, the stator-side magnetic flux $\phi$s denotes magnetic flux generated by the harmonic currents flowing in the phase windings 31U-31W of the stator coil 31. That is, the amplitude of the total resultant magnetic flux $\phi$total can be made lower than the amplitude of the field resultant magnetic flux $\phi$rt by changing the turn number ratio N2/N1. The difference in phase between the field resultant magnetic flux $\phi$rt and the stator-side magnetic flux $\phi$s is, for example, larger than 120° and smaller than 240°.

Figure 14A:
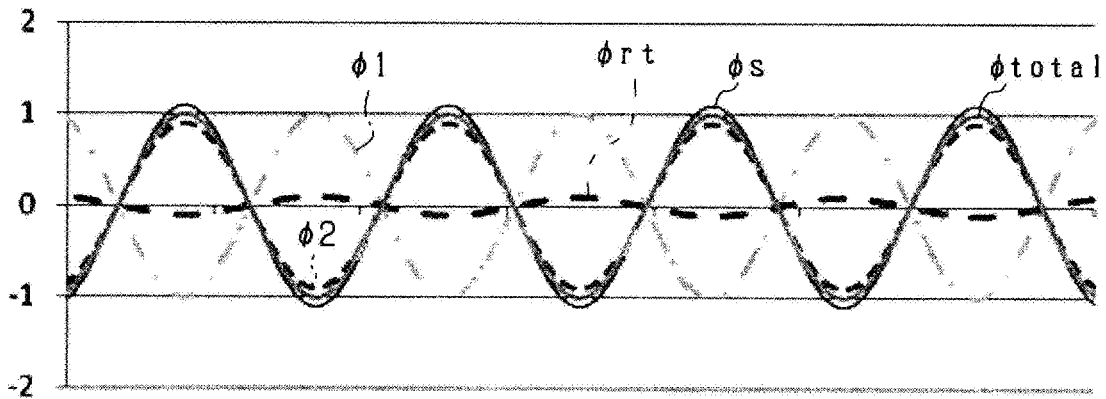
FIGS. 14A, 14B and 14C are waveform charts illustrating the waveforms of the first magnetic flux $\phi 1$, the second magnetic flux $\phi 2$, the field resultant magnetic flux $\phi rt$, stator-side magnetic flux $\phi s$ and total resultant magnetic flux $\phi total$ at different ratios of amplitude between $\phi 1$, $\phi 2$ and $\phi s$.
Figure 14B:
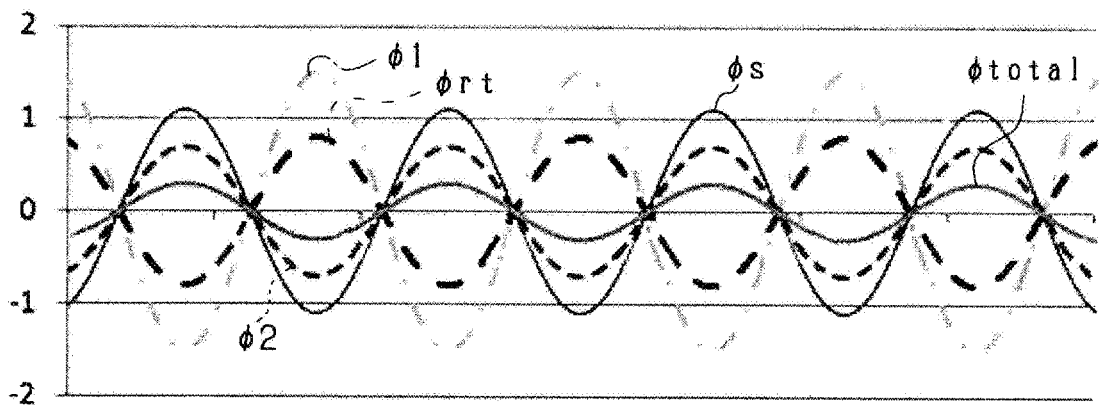
Figure 14C:
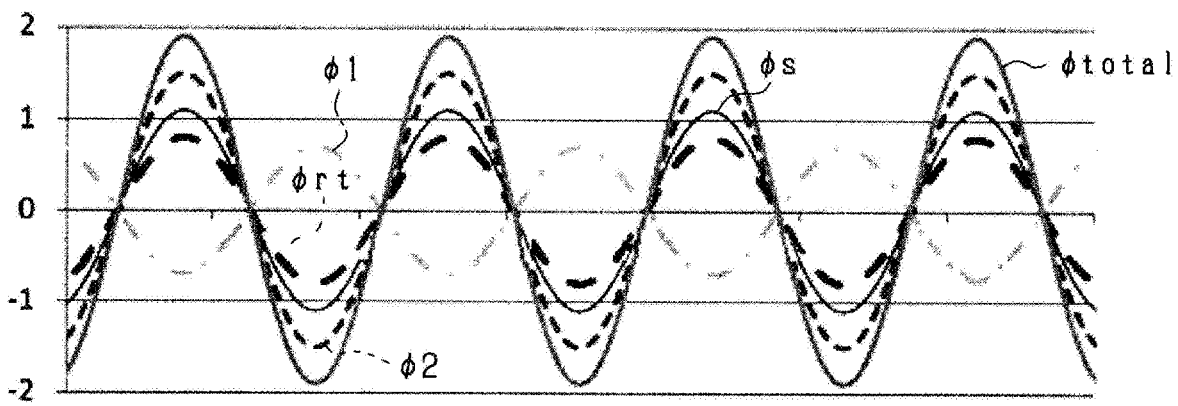

FIGS. 14A-14C show the waveforms of the first magnetic flux $\phi$1, the second magnetic flux $\phi$2, the field resultant magnetic flux $\phi$rt, the stator-side magnetic flux $\phi$s and the total resultant magnetic flux $\phi$total at different ratios of amplitude between $\phi$1, $\phi$2 and $\phi$s. In the examples shown in FIGS. 14A-14C, the difference in phase between the first magnetic flux $\phi$1 and the second magnetic flux $\phi$2 is equal to 180°. In addition, in FIGS. 14A-14C, the vertical axes are graduated to indicate the relationship in magnitude between the magnetic fluxes $\phi$1, $\phi$2, $\phi$rt, $\phi$s and $\phi$total.

FIG. 14A shows the waveforms of the first magnetic flux $\phi$1, the second magnetic flux $\phi$2, the field resultant magnetic flux $\phi$rt, the stator-side magnetic flux $\phi$s and the total resultant magnetic flux $\phi$total when the ratio of amplitude between $\phi$1, $\phi$2 and $\phi$s is equal to 1:0.9:1.1 and the difference in phase between the field resultant magnetic flux $\phi$rt and the stator-side magnetic flux $\phi$s is equal to 180°. As seen from FIG. 14A, even though it is aimed to smooth the field resultant magnetic flux $\phi$rt, it is not always possible to lower the amplitude of the total resultant magnetic flux $\phi$total due to the influence of the stator-side magnetic flux $\phi$s.

FIG. 14B shows the waveforms of the first magnetic flux $\phi$1, the second magnetic flux $\phi$2, the field resultant magnetic flux $\phi$rt, the stator-side magnetic flux $\phi$s and the total resultant magnetic flux $\phi$total when the ratio of amplitude between $\phi$1, $\phi$2 and $\phi$s is equal to 1.5:0.7:1.1 and the difference in phase between the field resultant magnetic flux φrt and the stator-side magnetic flux φs is equal to 180°. In the example shown in FIG. 14B, it becomes possible to more effectively lower the amplitude of the total resultant magnetic flux φtotal than in the example shown in FIG. 14A. Consequently, the amplitude of the total resultant magnetic flux φtotal becomes lower than the amplitude of the field resultant magnetic flux φrt.

FIG. 14C shows the waveforms of the first magnetic flux φ1, the second magnetic flux φ2, the field resultant magnetic flux φrt, the stator-side magnetic flux φs and the total resultant magnetic flux φtotal when the ratio of amplitude between φ1, φ2 and φs is equal to 0.7:1.5:1.1 and the difference in phase between the field resultant magnetic flux φrt and the stator-side magnetic flux φs is equal to 0°. In the example shown in FIG. 14C, since the difference in phase between the field resultant magnetic flux φrt and the stator-side magnetic flux φs is equal to 0°, the amplitude of the total resultant magnetic flux φtotal becomes higher than the amplitude of the field resultant magnetic flux φrt.

In view of the above, in the present embodiment, the capacitance C of the capacitor 90 and the turn number ratio N2/N1 are set so that when the harmonic currents are supplied to the phase windings 31U-31W of the stator coil 31, the amplitude of the total resultant magnetic flux φtotal becomes lower than the amplitude of the field resultant magnetic flux φrt. Consequently, it becomes possible to lower the torque ripple ratio of the rotating electric machine 30. It is well known in the art that harmonic current is superimposed on fundamental current in ordinary PWM controls. The inventor of the present application has first found that the torque ripple ratio of the rotating electric machine 30 can be made lower than that of an ordinary motor by making torque ripple due to the field resultant magnetic flux φrt and torque ripple due to the stator-side magnetic flux φs canceled by each other.

Moreover, the inventor of the present application has also found that it is more effective, in terms of securing high torque of the rotating electric machine 30, to focus on resonance of the series resonant circuit than on resonance of the parallel resonant circuit. Furthermore, the inventor has also found that it is preferable to set the frequency fs of the harmonic currents supplied to the phase windings 31U-31W of the stator coil 31 to be equal or close to the first resonance frequency f1 of the series resonant circuit. The above findings by the inventor will be described in detail hereinafter.

To keep the first resonance frequency f1 of the series resonant circuit at a predetermined frequency fcst under the constraint of keeping the turn number sum (N1+N2) (i.e., the sum of the number of turns N1 of the first winding 71a and the number of turns N2 of the second winding 71b) at a predetermined turn number Ncst, it is necessary to set the capacitance C of the capacitor 90 and the turn number ratio N2/N1 such that the higher the capacitance C of the capacitor 90, the higher the turn number ratio N2/N1. In addition, the predetermined frequency fcst is set to, for example, a value of fs which can be realized by the inverter 20 and satisfies the inequality (eq3) to be described later. Here, fs is the frequency of the harmonic currents supplied to the phase windings 31U-31W of the stator coil 31.

When the capacitance C of the capacitor 90 is varied in the range of 15 μF to 55 μF under the constraint of keeping the turn number sum (N1+N2) at the predetermined turn number Ncst and the first resonance frequency f1 at the predetermined frequency fcst, the turn number ratio N2/N1 falls within the range of 0.5 to 10.2 as shown in FIG. 15. In addition, in FIG. 15, the capacitance C, the turn number ratio N2/N1, the field current If, the torque and the torque ripple ratio under the above constraint are shown as the case of A-LINE.

The inventor of the present application has confirmed, through experimental investigation, that the torque of the rotating electric machine 30 can be kept high by setting the turn number ratio N2/N1 to be in the range of 0.5 to 5.2 under the above A-line constraint.

Figure 16A:
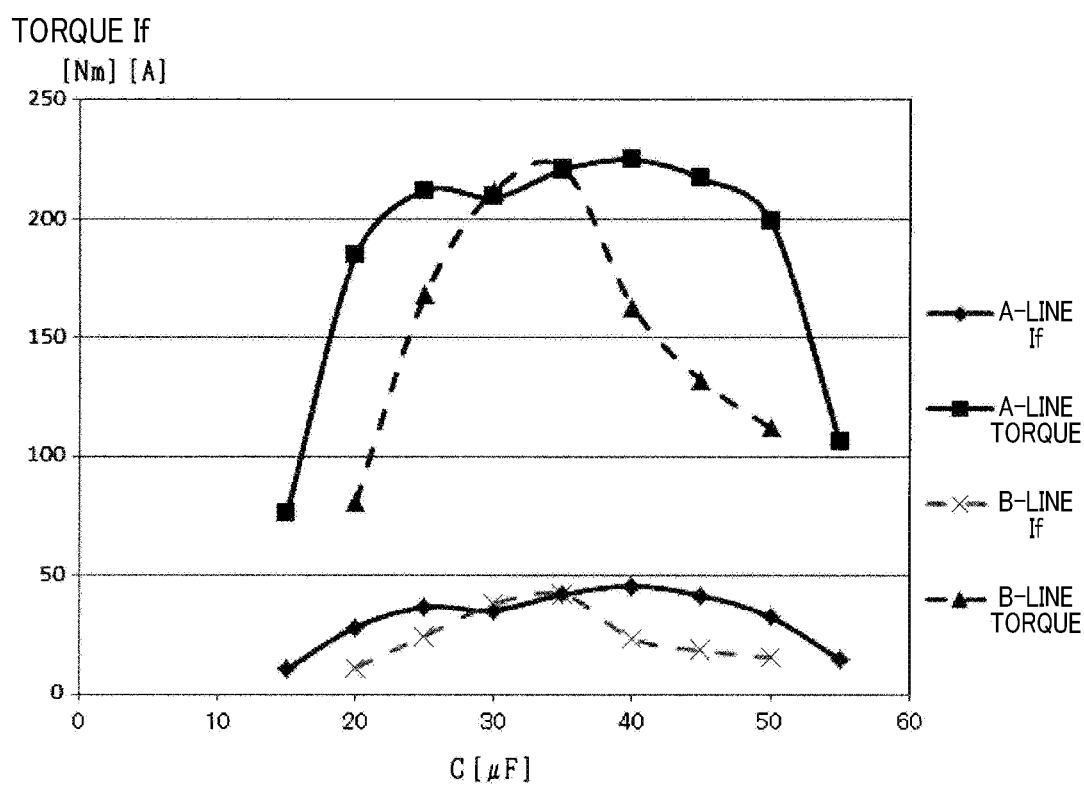
FIG. 16A is a graphical representation illustrating the relationship of field current and torque to the capacitance of the capacitor.
Figure 16B:
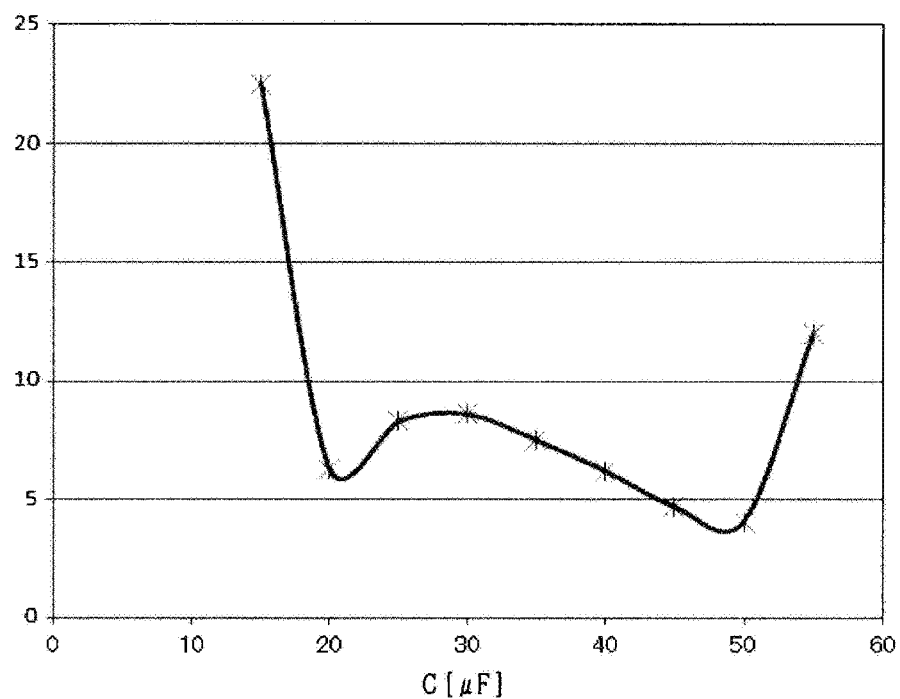
FIG. 16B is a graphical representation illustrating the relationship of torque ripple ratio to the capacitance of the capacitor.
Figure 17A:
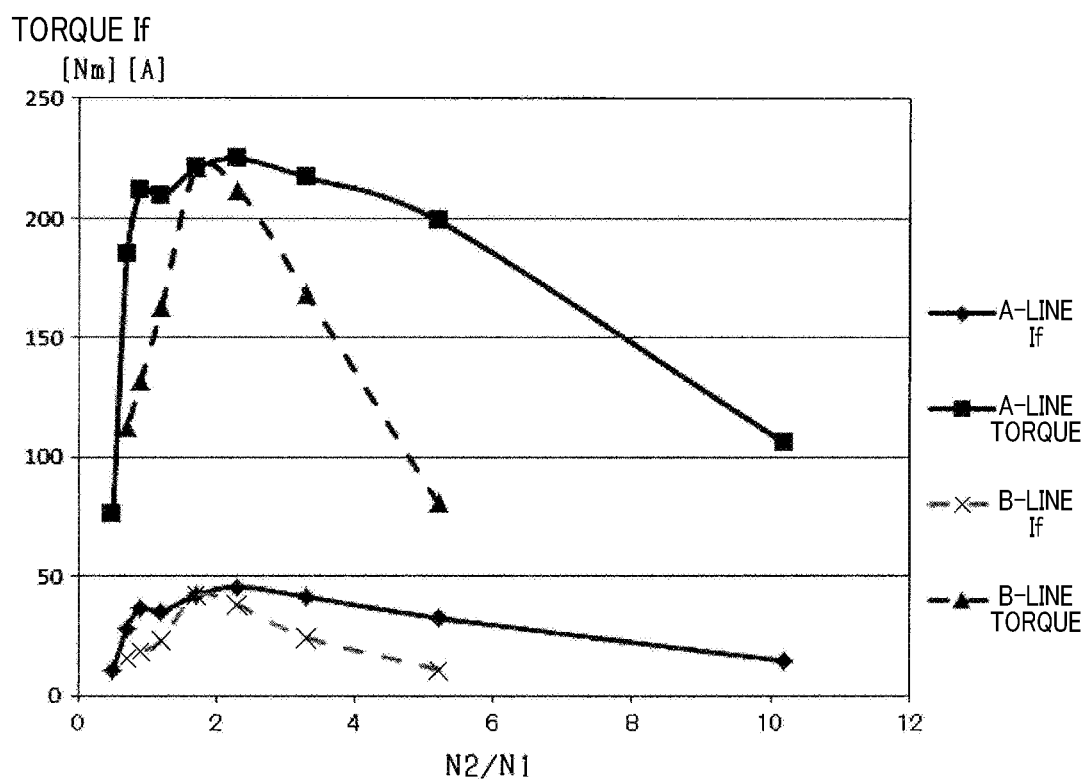
FIG. 17A is a graphical representation illustrating the relationship of field current and torque to the ratio of the number of turns between the first and second windings.
Figure 17B:
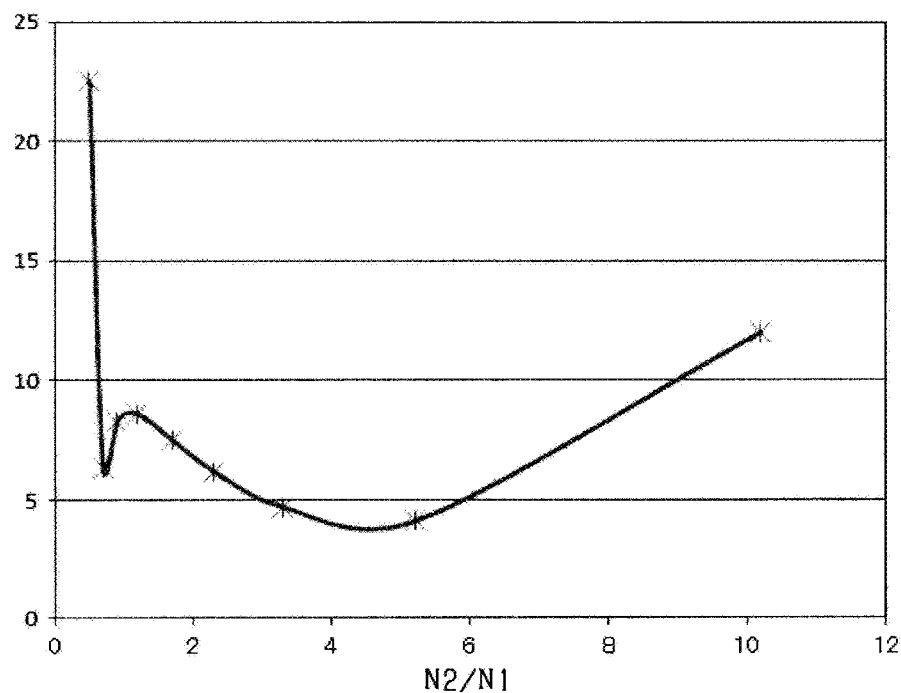
FIG. 17B is a graphical representation illustrating the relationship of torque ripple ratio to the ratio of the number of turns between the first and second windings.

FIG. 16A shows the relationship of the field current If and the torque of the rotating electric machine 30 to the capacitance C of the capacitor 90. FIG. 16B shows the relationship of the torque ripple ratio of the rotating electric machine 30 to the capacitance C of the capacitor 90. FIG. 17A shows the relationship of the field current If and the torque of the rotating electric machine 30 to the turn number ratio N2/N1. FIG. 17B shows the relationship of the torque ripple ratio of the rotating electric machine 30 to the turn number ratio N2/N1.

As seen from FIGS. 15, 16A-16B and 17A-17B, with the first resonance frequency f1 of the series resonant circuit kept at the predetermined frequency fcst, the torque of the rotating electric machine 30 can be kept high by setting the capacitance C of the capacitor 90 to be in the range of 20 μF to 50 μF and the turn number ratio N2/N1 to be in the range of 0.5 to 5.2 (i.e., 20 μF≤C≤50 μF and 0.5≤N2/N1≤5.2).

On the other hand, to keep the second resonance frequency f2 of the parallel resonant circuit at the predetermined frequency fcst under the constraint of keeping the turn number sum (N1+N2) at the predetermined turn number Ncst, it is necessary to set the capacitance C of the capacitor 90 and the turn number ratio N2/N1 such that the higher the capacitance C of the capacitor 90, the lower the turn number ratio N2/N1. In FIG. 15, the capacitance C, the turn number ratio N2/N1, the field current If and the torque under the above constraint are shown as the case of B-LINE.

As seen from FIGS. 15, 16A and 17A, in the case of setting the turn number ratio N2/N1 to be in the range of 0.7 to 5.2 (i.e., 0.7≤N2/N1≤5.2) under the constraint of keeping the turn number sum (N1+N2) at the predetermined turn number Ncst and the second resonance frequency f2 at the predetermined frequency fcst, the torque of the rotating electric machine 30 becomes highest when the turn number ratio N2/N1 is equal to 1.7. Moreover, with the turn number ratio N2/N1 deviating from 1.7, the torque of the rotating electric machine 30 considerably drops.

When the turn number ratio N2/N1 is set to be in the range of 0.5 to 5.2, the torque of the rotating electric machine 30 tends to be lower under the B-line constraint (i.e., the constraint of keeping the second resonance frequency f2 at the predetermined frequency fcst) than under the A-line constraint (i.e., the constraint of keeping the first resonance frequency f1 at the predetermined frequency fcst). This is because the first winding 71a is radially located closer than the second winding 71b to the stator 50 and thus more susceptible than the second winding 71b to the magnetic flux generated by the harmonic currents flowing in the phase windings 31U-31W of the stator coil 31.

Accordingly, the torque of the rotating electric machine 30 can be kept higher by setting the capacitance C and the turn number ratio N2/N1 under the A-line constraint pertaining to the series resonant circuit than under the B-line constraint pertaining to the parallel resonant circuit. Moreover, under the A-line constraint, the capacitance C can be set within the range of 20 μF to 50 μF and the turn number ratio N2/N1 can be set within the range of 0.5 to 5.2; therefore, the degree of freedom of setting the capacitance C and the turn number ratio N2/N1 is improved.

As seen from FIGS. 16B and 17B, with the capacitance C set to be in the range of 20 μF to 50 μF and the turn number ratio N2/N1 set to be in the range of 0.7 to 5.2, it is possible to effectively lower the torque ripple ratio while keeping the torque of the rotating electric machine 30 high.

In the present embodiment, the frequency fs of the harmonic currents supplied to the phase windings 31U-31W of the stator coil 31 is set to satisfy the following inequality (eq3). Moreover, the controller 40 controls the inverter 20 to supply the phase windings 31U-31W of the stator coil 31 with the harmonic currents having the set frequency fs.

$$\frac{A}{2\pi\sqrt{(2\times N2)^2 \cdot C}} \leq fs \leq \frac{A}{2\pi\sqrt{(0.2\times N2)^2 \cdot C}} \quad (eq3)$$

The above inequality (eq3) is derived as follows. The inequality (0.5≤N2/N1≤5.2) can be transformed into (0.19≤N1/N2≤2). Moreover, for the sake of simplicity, (0.20≤N1/N2≤2) is used instead of (0.19≤N1/N2≤2). Further, (0.20×N2≤N1≤2×N2) is derived from (0.20≤N1/N2≤2). Moreover, the inductance L1 of the first winding 71a and the inductance L2 of the second winding 71b can be expressed by the following equations:

$$L1=\mu\times N1^2\times(S1/l1); \text{ and}$$

$$L2=\mu\times N2^2\times(S2/l2),$$

where μ is the magnetic permeability, N1 is the number of turns of the first winding 71a, S1 and l1 are respectively the cross-sectional area and length of a magnetic path of the first winding 71a, N2 is the number of turns of the second winding 71b, S2 and l2 are respectively the cross-sectional area and length of a magnetic path of the second winding 71b.

Substituting the equations of the inductances L1 and L2 respectively into the above-described equations (eq1) and (eq2), the following equations can be derived:

$$f1=1/(2\times\pi\times\sqrt{\mu\times N1^2\times(S1/l1)\times C})=A/(2\times\pi\times\sqrt{N1^2\times C});$$
and $$f2=1/(2\times\pi\times\sqrt{\mu\times N2^3\times(S2/l2)\times C})=A/(2\times\pi\times\sqrt{N2^2\times C}),$$

where A is a predetermined coefficient.

In addition, the predetermined coefficient A can be expressed by the following equation:

$$A=1/\sqrt{\mu\times(S1/l1)}=1/\sqrt{\mu\times(S2/l2)}$$

Furthermore, in the present embodiment, the frequency fs of the harmonic currents supplied to the phase windings 31U-31W of the stator coil 31 is set to be equal to the first resonance frequency f1 of the series resonant circuit, i.e., fs=f1=A/(2×π×√(N1²×C)).

Then, the above inequality (eq3) is derived from the above equation of fs and the inequality of (0.20>N2≤N1≤2×N2).

Moreover, the following inequality (eq5) is derived by substituting the following equation (eq4) into the above inequality (eq3).

$$fH = \frac{A}{2\pi\sqrt{N2^2 \cdot C}} \quad (eq4)$$

$$0.5fH \leq fs \leq 5fH \quad (eq5)$$

According to the present embodiment, it is possible to achieve the following advantageous effects.

In the present embodiment, the field coil type rotating electric machine 30 includes the stator 50, the field winding 70 and the rotor 60. The stator 50 includes the stator coil 31 that is comprised of the U-phase winding 31U, the V-phase winding 31V and the W-phase winding 31W. The field coil 70 includes the serially-connected winding pair consisting of the first and second windings 71a and 71b that are connected in series with each other. The rotor 60 includes the rotor core 61 and the main pole portions 62 that are formed at predetermined intervals in the circumferential direction and each radially protrude from the rotor core 61. Each of the first and second windings 71a and 71b of the field coil 70 is wound on each of the main pole portions 62 of the rotor 60. Each of the phase windings 31U-31W of the stator coil 31 is configured to be supplied with harmonic current to induce the field current If in the field coil 70. The field coil type rotating electric machine 30 further includes the diode 80 and the capacitor 90. The diode 80 has its cathode connected to the first-winding-side end of the serially-connected winding pair and its anode connected to the second-winding-side end of the serially-connected winding pair. The capacitor 90 is connected in parallel with the second winding 71b. In the field coil type rotating electric machine 30, there are formed both the series resonant circuit including the first winding 71a and the capacitor 90 and the parallel resonant circuit including the second winding 71b and the capacitor 90. The first winding 71a is radially located closer than the second winding 71b to the stator 50. The capacitance C of the capacitor 90 and the turn number ratio N2/N1, which is the ratio of the number of turns N2 of the second winding 71b to the number of turns N1 of the first winding 71a, are set to have the amplitude of the total resultant magnetic flux ϕtotal lower than the amplitude of the field resultant magnetic flux ϕrt when the harmonic currents are supplied to the phase windings 31U-31W of the stator coil 31. The total resultant magnetic flux ϕtotal is the resultant of the field resultant magnetic flux ϕrt and the stator-side magnetic flux ϕs generated by the harmonic currents flowing in the phase windings 31U-31W of the stator coil 31. The field resultant magnetic flux ϕrt is the resultant of the first magnetic flux ϕ1 generated by the harmonic current flowing in the first winding 71a and the second magnetic flux ϕ2 generated by the harmonic current flowing in the second winding 71b.

With the above configuration, upon the harmonic currents flowing in the phase windings 31U-31W of the stator coil 31, harmonic currents are induced to flow respectively in the first and second windings 71a and 71b of the field coil 70. The difference in phase between the harmonic current flowing in the series resonant circuit including the first winding 71a and the harmonic current flowing in the parallel resonant circuit including the second winding 71b is, for example, larger than 120° and smaller than 240°. Moreover, with change in the turn number ratio N2/N1, both the amplitude of the first magnetic flux ϕ1 generated by the harmonic current flowing in the first winding 71a and the amplitude of the second magnetic flux ϕ2 generated by the harmonic current flowing in the second winding 71b change. Consequently, the amplitude of the field resultant magnetic flux ϕrt, which is the resultant of the first magnetic flux ϕ1 and the second magnetic flux ϕ2, also changes. Furthermore, with change in the amplitude of the field resultant magnetic flux ϕrt, the amplitude of the total resultant magnetic flux ϕtotal, which is the resultant of the field resultant magnetic flux ϕrt and the stator-side magnetic flux ϕs generated by the harmonic currents flowing in the phase windings 31U-31W of the stator coil 31, also changes. That is, the amplitude of the total resultant magnetic flux ϕtotal can be made lower than the amplitude of the field resultant magnetic flux ϕrt by changing the turn number ratio N2/N1. In view of the above, in the present embodiment, the capacitance C of the capacitor 90 and the turn number ratio N2/N1 are set so that when the harmonic currents are supplied to the phase windings 31U-31W of the stator coil 31, the amplitude of the total resultant magnetic flux ϕtotal becomes lower than the amplitude of the field resultant magnetic flux ϕrt. Consequently, it becomes possible to lower the torque ripple ratio of the rotating electric machine 30.

Moreover, in the present embodiment, the turn number ratio N2/N1 is set to be in the range of 0.5 to 5.2 with the capacitance C of the capacitor 90 set to be in the range of 20 μF to 50 μF under the constraint of keeping the first resonance frequency f1 of the series resonant circuit at the predetermined frequency fcst and the turn number sum (N1+N2) at the predetermined turn number Ncst. In other words, the first resonance frequency f1 of the series resonant circuit is set to the predetermined frequency fcst by setting the capacitance C of the capacitor 90 to be in the range of 20 μF to 50 μF and the turn number ratio N2/N1 to be in the range of 0.5 to 5.2. In addition, upon the setting of the first resonance frequency f1, the second resonance frequency f2 of the parallel resonant circuit is also set accordingly.

More specifically, to keep the first resonance frequency f1 of the series resonant circuit including the first winding 71a at the predetermined frequency fcst under the constraint of keeping the turn number sum (N1+N2) at the predetermined turn number Ncst, it is necessary to set the capacitance C of the capacitor 90 and the turn number ratio N2/N1 such that the higher the capacitance C of the capacitor 90, the higher the turn number ratio N2/N1. The inventor of the present application has confirmed, through experimental investigation, that when the capacitance C of the capacitor 90 is varied in the range of 20 μF to 50 μF under the A-line constraint (i.e., the constraint of keeping the first resonance frequency f1 of the series resonant circuit at the predetermined frequency fcst and the turn number sum (N1+N2) at the predetermined turn number Ncs), the turn number ratio N2/N1 falls within the range of 0.5 to 5.2. Moreover, the inventor has also confirmed, through experimental investigation, that the torque of the rotating electric machine 30 can be kept high by setting the turn number ratio N2/N1 to be in the range of 0.5 to 5.2 under the A-line constraint.

On the other hand, to keep the second resonance frequency f2 of the parallel resonant circuit including the second winding 71b at the predetermined frequency fcst under the constraint of keeping the turn number sum (N1+N2) at the predetermined turn number Ncst, it is necessary to set the capacitance C of the capacitor 90 and the turn number ratio N2/N1 such that the higher the capacitance C of the capacitor 90, the lower the turn number ratio N2/N1. The inventor has confirmed, through experimental investigation, that: in the case of setting the turn number ratio N2/N1 to be in the range of 0.7 to 5.2 under the B-line constraint (i.e., the constraint of keeping the second resonance frequency f2 of the parallel resonant circuit at the predetermined frequency fcst and the turn number sum (N1+N2) at the predetermined turn number Ncst), the torque of the rotating electric machine 30 becomes highest when the turn number ratio N2/N1 is equal to 1.7; with the turn number ratio N2/N1 deviating from 1.7, the torque of the rotating electric machine 30 considerably drops. Moreover, the inventor has also confirmed, through experimental investigation, that when the turn number ratio N2/N1 is set to be in the range of 0.5 to 5.2, the torque of the rotating electric machine 30 tends to be lower under the B-line constraint than under the A-line constraint. This is because the first winding 71a is radially located closer than the second winding 71b to the stator 50 and thus more susceptible than the second winding 71b to the stator-side magnetic flux ϕs generated by the harmonic currents flowing in the phase windings 31U-31W of the stator coil 31.

Accordingly, the torque of the rotating electric machine 30 can be kept higher by setting the capacitance C of the capacitor 90 and the turn number ratio N2/N1 under the A-line constraint pertaining to the series resonant circuit than under the B-line constraint pertaining to the parallel resonant circuit. Moreover, under the A-line constraint, the capacitance C can be set within the range of 20 μF to 50 μF and the turn number ratio N2/N1 can be set within the range of 0.5 to 5.2; therefore, the degree of freedom of setting the capacitance C and the turn number ratio N2/N1 is improved.

In view of the above, in the present embodiment, the first resonance frequency f1 of the series resonant circuit is set to the predetermined frequency fcst by setting the capacitance C of the capacitor 90 to be in the range of 20 μF to 50 μF and the turn number ratio N2/N1 to be in the range of 0.5 to 5.2. Consequently, it becomes possible to improve the degree of freedom of setting the capacitance C and the turn number ratio N2/N1 to keep the torque of the rotating electric machine 30 high. For example, the turn number ratio N2/N1 may be set to be in the range of 0.7 to 5.2. In this case, it is possible to effectively lower the torque ripple ratio while keeping the torque of the rotating electric machine 30 high.

Modification of First Embodiment

Each of the first and second windings 71a and 71b of the field coil 70 may be formed of a rectangular conductor wire (i.e., an electrical conductor wire having a rectangular cross-sectional shape). In this case, it is possible to improve the space factor of the field coil 70, thereby improving the efficiency of the field coil type rotating electric machine 30. Moreover, in this case, adjacent portions of the first and second windings 71a and 71b of the field coil 70 are in surface contact with each other; consequently, when the centrifugal force is applied to the windings 71a and 71b, it is possible to lower the load acting between adjacent portions of the windings 71a and 71b, thereby preventing damage to insulating coats of the windings 71a and 71b. Furthermore, in this case, it is possible to improve the ampere-turn (AT) of the field coil 70, thereby broadening the excitation range of the field coil 70. As a result, it is possible to improve the torque controllability of the field coil type rotating electric machine 30.

In addition, each of the first and second windings 71a and 71b of the field coil 70 may be constituted of an α winding of a rectangular conductor wire, such as one shown in FIG. 5(A) of Japanese Patent Application Publication No. JP 2008-178211 A.

Second Embodiment

Figure 18:
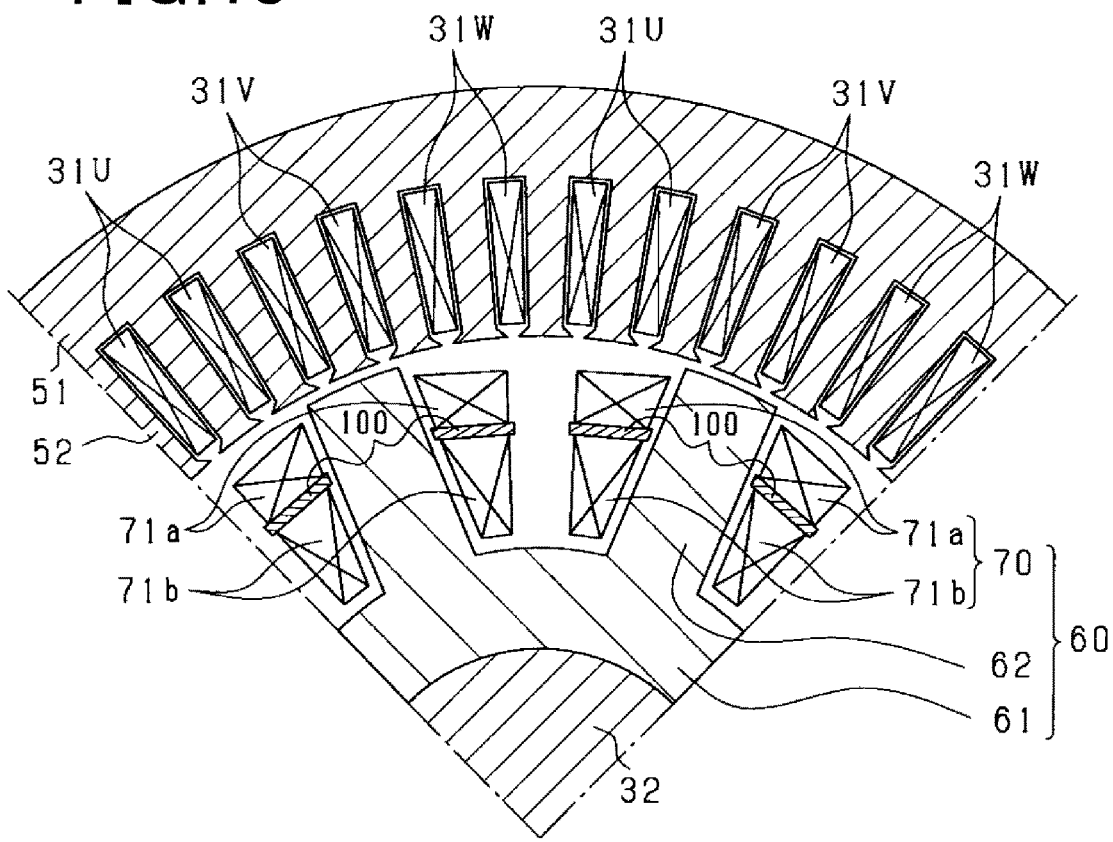
FIG. 18 is a transverse cross-sectional view of both part of a rotor and part of a stator of a field coil type rotating electric machine according to a second embodiment.

As shown in FIG. 18, in a field coil type rotating electric machine 30 according to the second embodiment, in the rotor 60, there are provided partitioning members 100 between the first and second windings 71a and 71b of the field coil 70; the partitioning members 100 are formed of a soft-magnetic material. Each of the partitioning members 100 is, for example, ring-shaped and has one of the main pole portions 62 of the rotor 60 inserted in a center hole thereof. Moreover, when viewed along the axial direction, each of the partitioning members 100 has an elongate shape extending in the circumferential direction. With the partitioning members 100 interposed between the first and second windings 71a and 71b of the field coil 70, the two windings 71a and 71b are radially separated from each other. In addition, the partitioning members 100 have a smaller radial thickness than each of the first and second windings 71a and 71b.

Figure 19:
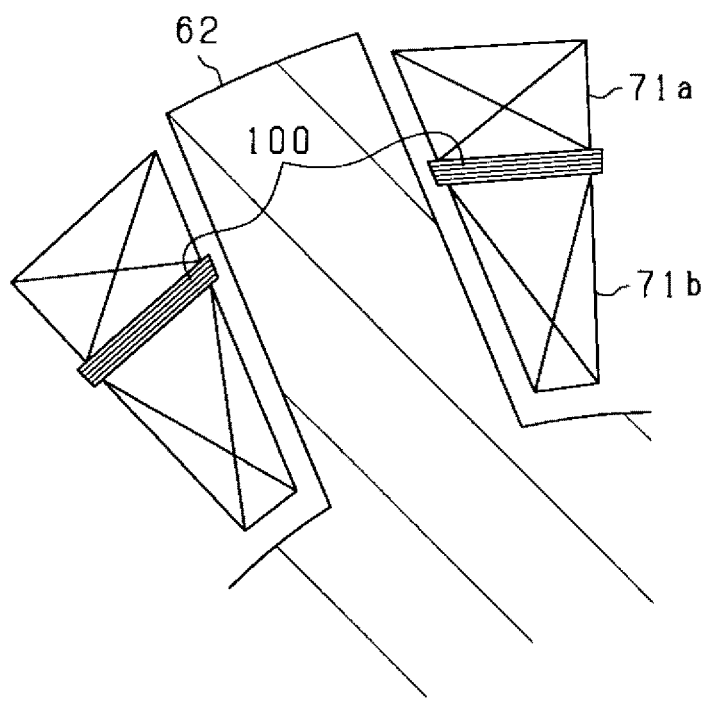
FIG. 19 is an enlarged view of part of FIG. 18.

Moreover, as shown in FIG. 19, each of the partitioning members 100 may be formed of a plurality of sheets that are made of a soft-magnetic material (e.g., magnetic steel) and laminated in a radial direction. With the above configuration, it is possible to lower eddy current loss in the partitioning members 100. In addition, with the sheets being laminated in the radial direction, it is possible to set the radial thickness of the partitioning members 100 to a small value according to the thickness of the sheets while securing the circumferential length of the partitioning members 100.

In the present embodiment, with the partitioning members 100 interposed between the first and second windings 71a and 71b of the field coil 70, most of the leakage magnetic flux flows through the partitioning members 100, not through the field coil 70. Consequently, it becomes difficult for voltages of opposite polarities to be induced respectively in the first and second windings 71a and 71b; it also becomes difficult for voltages of opposite polarities to be induced respectively in different parts of each of the first and second windings 71a and 71b. As a result, it becomes possible to increase electric current induced in each of the first and second windings 71a and 71b in each of the four patterns shown in FIG. 8.

While the above particular embodiments have been shown and described, it will be understood by those skilled in the art that various modifications, changes, and improvements may be made without departing from the spirit of the present disclosure.

(1) In the above-described embodiments, the field coil 70 is constituted of the serially-connected winding pair consisting of the first and second windings 71a and 71b that are connected in series with each other.

Figure 20:
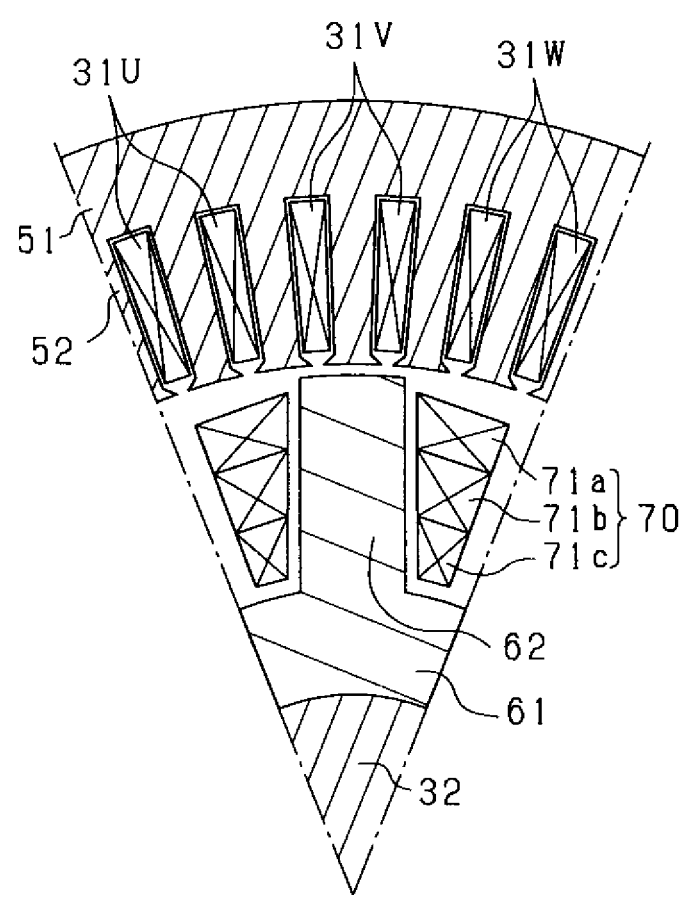
FIG. 20 is a transverse cross-sectional view of both part of a rotor and part of a stator of a field coil type rotating electric machine according to a modification.

As an alternative, as shown in FIG. 20, the field coil 70 may be constituted of a serially-connected winding set consisting of a first winding 71a, a second winding 71b and a third winding 71c that are connected in series with each other. Each of the first to the third windings 71a-71c is wound on each of the main pole portions 62 of the rotor 60. More specifically, on each of the main pole portions 62, the first to the third windings 71a-71c are wound so that: the first winding 71a is located radially outermost (i.e., closest to the stator 50); the third winding 71c is located radially innermost (i.e., furthest from the stator 50); and the second winding 71b is radially interposed between the first winding 71a and the third winding 71c. Moreover, on each of the main pole portions 62, the first to the third windings 71a-71c are wound in the same direction. Furthermore, for each circumferentially-adjacent pair of the main pole portions 62, the winding direction of the first to the third windings 71a-71c on one of the main pole portions 62 of the circumferentially-adjacent pair is opposite to the winding direction of the first to the third windings 71a-71c on the other of the main pole portions 62 of the circumferentially-adjacent pair. Consequently, the magnetization directions of the main pole portions 62 of the circumferentially-adjacent pair are opposite to each other.

Figure 21:
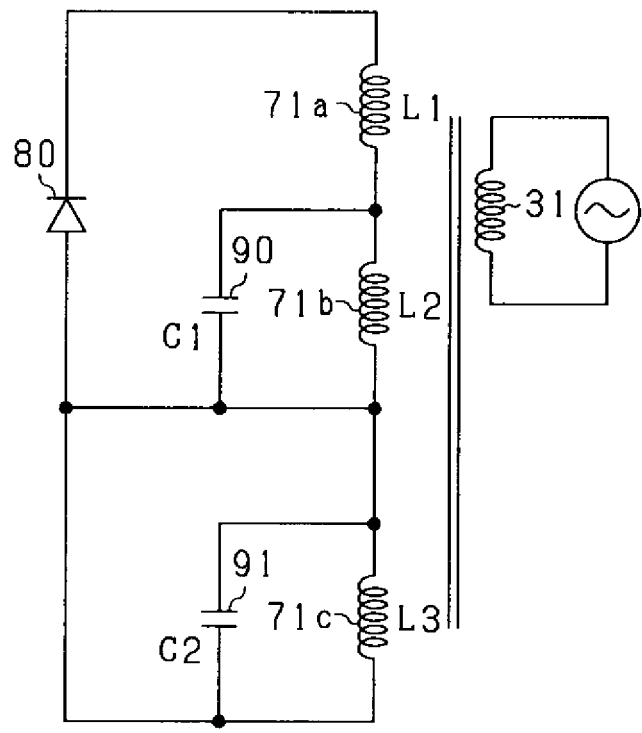
FIG. 21 is a configuration diagram of resonant circuits formed in the field coil type rotating electric machine according to the modification shown in FIG. 20.

FIG. 21 shows an electric circuit formed in the rotor 60 that has the first to the third windings 71a-71c of the field coil 70 wound on the same main pole portions 62.

In the rotor 60, there is further provided a second capacitor 91 in addition to the capacitor 90 (hereinafter, to be referred to as the first capacitor 90). A first end of the third winding 71c is connected with the second end of the second winding 71b. A second end of the third winding 71c is connected with the anode of the diode 80. The second capacitor 91 is connected in parallel with the third winding 71c. In addition, in FIG. 21, L3 represents the inductance of the third winding 71c and C1 and C2 respectively represent the capacitances of the first and second capacitors 90 and 91.

The first winding 71a of the field coil 70, the first capacitor 90 and the diode 80 together form a first series resonant circuit. The first series resonant circuit has a resonance frequency which will be referred to as the first resonance frequency f1 hereinafter; the first resonance frequency f1 can be calculated by the equation (eq1) described in the first embodiment. The second winding 71b of the field coil 70 and the first capacitor 90 together form a first parallel resonant circuit. The first parallel resonant circuit has a resonance frequency which will be referred to as the second resonance frequency f2 hereinafter; the second resonance frequency f2 can be calculated by the equation (eq2) described in the first embodiment. The first and second windings 71a and 71b of the field coil 70, the second capacitor 91 and the diode 80 together form a second series resonant circuit. The second series resonant circuit has a resonance frequency which will be referred to as the third resonance frequency f3 hereinafter; the third resonance frequency f3 can be calculated by the following equation (eq6). The third winding 71c of the field coil 70 and the second capacitor 91 together form a second parallel resonant circuit. The second parallel resonant circuit has a resonance frequency which will be referred to as the fourth resonance frequency f4 hereinafter; the fourth resonance frequency f4 can be calculated by the following equation (eq7).

$$f3 = \frac{1}{2\pi\sqrt{(L1+L2)\cdot C2}} \quad \text{(eq6)}$$

$$f4 = \frac{1}{2\pi\sqrt{L3\cdot C2}} \quad \text{(eq7)}$$

The second series resonant circuit and the second parallel resonant circuit function similarly to the first series resonant circuit and the first parallel resonant circuit.

With the above configuration, when the frequency fs of the harmonic currents supplied to the phase windings 31U-31W of the stator coil 31 deviates from a given frequency (e.g., the first resonance frequency f1), if the frequency fs is equal or close to the third resonance frequency f3 or the fourth resonance frequency f4, it is still possible to increase the field current flowing in the field coil 70.

In addition, the frequency fs of the harmonic currents supplied to the phase windings 31U-31W of the stator coil 31 may deviate from a given frequency when the electrical angular frequency of the rotating electric machine 30 is high. This is because the higher the electrical angular frequency, the smaller the number M of cycles of the harmonic currents allowed to be superimposed per period of the fundamental currents (here, M is a natural number) and thus the larger the variation in the frequency fs when the number of cycles of the harmonic currents superimposed per period of the fundamental currents is changed from M to (M−1). For example, when the number M is changed between 4 and 3, the variation in the frequency fs is about 30%. Here, "M=3" represents that for each of the phase currents of the stator coil 31, the number of cycles of the harmonic current superimposed the fundamental current of the phase current per period of the fundamental current is equal to 3; and 3 is considered to be the minimum value of M which can be used to induce the field current in the field coil 70.

Figure 22:
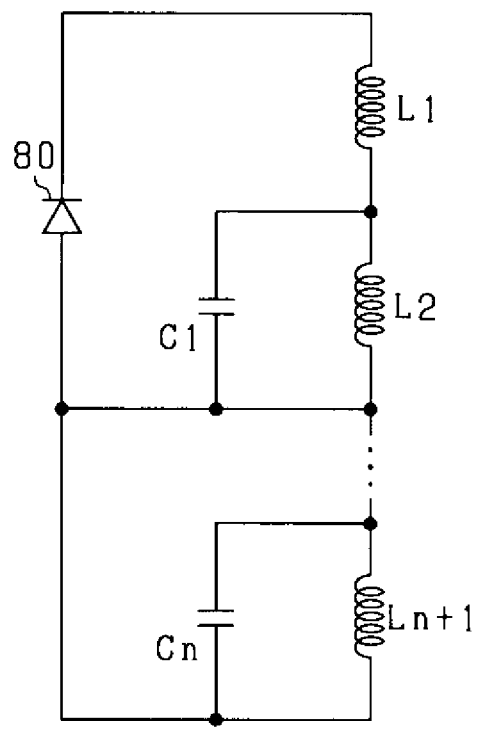
FIG. 22 is a configuration diagram of resonant circuits formed in a field coil type rotating electric machine according to another modification.

(2) As shown in FIG. 22, the field coil 70 may also be constituted of a serially-connected winding set consisting of (n+1) windings that are connected in series with each other, where n is a natural number greater than or equal to 3. In this case, the number of the capacitors included in the electric circuit formed in the rotor 60 is equal to n.

Figures 23A, 23B:
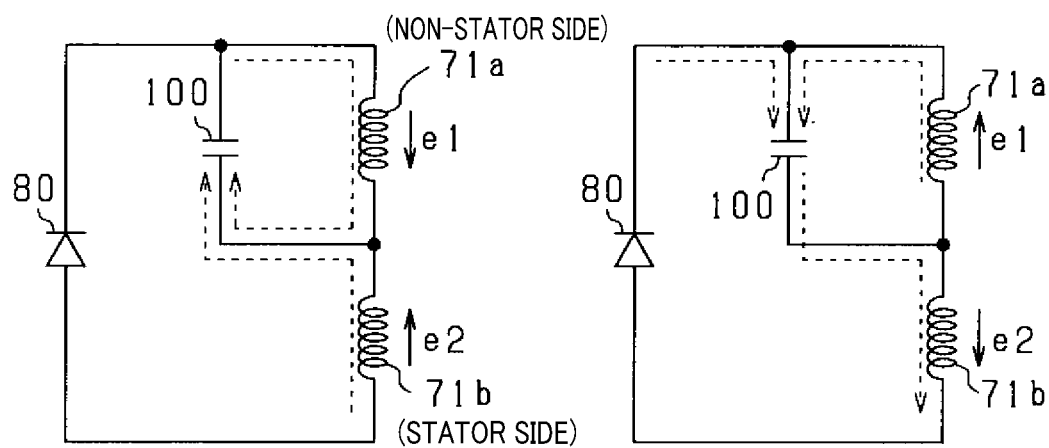
FIGS. 23A and 23B are schematic circuit diagrams illustrating the flow of electric currents induced in first and second windings of a field coil of a field coil type rotating electric machine according to yet another modification.

(3) As shown in FIGS. 23A and 23B, a capacitor 100 may be connected in parallel with the first winding 71a. In this case, the second winding 71b, the capacitor 100 and the diode 80 together form a series resonant circuit; the first winding 71a and the capacitor 100 together form a parallel resonant circuit. In addition, in this case, the second winding 71b is radially located closer than the first winding 71a to the stator 50. In other words, on each of the main pole portions 62 of the rotor 60, the first winding 71a is wound on the radially inner side (i.e., the non-stator side) while the second winding 71b is wound on the radially outer side (i.e., the stator side).

In the electric current shown in FIGS. 23A and 23B, the capacitance C of the capacitor 100 and the turn number ratio N2/N1 (i.e., the ratio of the number of turns N2 of the second winding 71b to the number of turns N1 of the first winding 71a) may be set so that when the harmonic currents are supplied to the phase windings 31U-31W of the stator coil 31, the amplitude of the total resultant magnetic flux ϕtotal becomes lower than the amplitude of the field resultant magnetic flux ϕrt. Here, as described in the first embodiment, the total resultant magnetic flux ϕtotal is the resultant of the field resultant magnetic flux ϕft and the stator-side magnetic flux ϕs generated by the harmonic currents flowing in the phase windings 31U-31W of the stator coil 31. The field resultant magnetic flux ϕrt is the resultant of the first magnetic flux ϕ1 generated by the harmonic current flowing in the first winding 71a and the second magnetic flux ϕ2 generated by the harmonic current flowing in the second winding 71b.

(4) In the above-described embodiments, the rotating electric machine 30 is of an inner rotor type where the rotor 60 is arranged radially inside the stator 50.

As an alternative, the rotating electric machine 30 may be of an outer rotor type where a rotor is arranged radially outside a stator. In this case, the rotor may include a rotor core and main pole portions which each protrude radially inward from the rotor core and are spaced at predetermined intervals in the circumferential direction.

(5) In the above-described embodiments, the field coil 70 is formed of aluminum wires. Alternatively, the field coil 70 may be formed of other materials, such as copper wires or CNTs (Carbon Nanotubes).

Moreover, in the above-described embodiments, the field coil 70 is formed by compression shaping. Alternatively, the field coil 70 may be formed without compression shaping.

What is claimed is:

1. A field coil type rotating electric machine comprising:
a stator including a stator coil that is comprised of a plurality of phase windings;
a field coil including a serially-connected winding pair consisting of a first winding and a second winding that are connected in series with each other; and
a rotor including a rotor core and a plurality of main pole portions that are formed at predetermined intervals in a circumferential direction and each radially protrude from the rotor core,
wherein
each of the first and second windings of the field coil is wound on each of the main pole portions of the rotor,
each of the phase windings of the stator coil is configured to be supplied with harmonic current to induce field current in the field coil,
the field coil type rotating electric machine further comprises a diode and a capacitor,
the diode has its cathode connected to a first-winding-side end of the serially-connected winding pair and its anode connected to a second-winding-side end of the serially-connected winding pair,
the capacitor is connected in parallel with the second winding,
in the field coil type rotating electric machine, there are formed both a series resonant circuit including the first winding and the capacitor and a parallel resonant circuit including the second winding and the capacitor,
the first winding is radially located closer than the second winding to the stator, and
a capacitance of the capacitor and a turn number ratio, which is the ratio of the number of turns of the second winding to the number of turns of the first winding, are set to have an amplitude of a total resultant magnetic flux lower than an amplitude of a field resultant magnetic flux when the harmonic currents are supplied to the phase windings of the stator coil, the total resultant magnetic flux being the resultant of the field resultant magnetic flux and magnetic flux generated by the harmonic currents flowing in the phase windings of the stator coil, the field resultant magnetic flux being the resultant of magnetic flux generated by harmonic current flowing in the first winding and magnetic flux generated by harmonic current flowing in the second winding.

2. The field coil type rotating electric machine as set forth in claim 1, wherein the turn number ratio is set to be higher than or equal to 0.5 and lower than or equal to 5.2 with the capacitance of the capacitor set to be in a predetermined range under a constraint of keeping a resonance frequency of the series resonant circuit at a predetermined frequency and a turn number sum, which is the sum of the number of turns of the first winding and the number of turns of the second winding, at a predetermined turn number.

3. The field coil type rotating electric machine as set forth in claim 2, wherein $$\frac{A}{2\pi\sqrt{(2 \times N2)^2 \cdot C}} \leq fs \leq \frac{A}{2\pi\sqrt{(0.2 \times N2)^2 \cdot C}}$$

where A is a predetermined coefficient, N2 is the number of turns of the second winding, C is the capacitance of the capacitor and fs is a frequency of the harmonic currents supplied to the phase windings of the stator coil.

4. The field coil type rotating electric machine as set forth in claim 2, wherein the predetermined range is higher than or equal to 20 μF and lower than or equal to 50 μF.

5. The field coil type rotating electric machine as set forth in claim 2, wherein the turn number ratio is set to be higher than or equal to 0.7 and lower than or equal to 5.2.

6. A field coil type rotating electric machine (30) comprising:
- a stator (50) including a stator coil (31) that is comprised of a plurality of phase windings (31U, 31V, 31W);
- a field coil (70) including a serially-connected winding pair consisting of a first winding (71a) and a second winding (71b) that are connected in series with each other; and
- a rotor (60) including a rotor core (61) and a plurality of main pole portions (62) that are formed at predetermined intervals in a circumferential direction and each radially protrude from the rotor core, wherein
- each of the first and second windings of the field coil is wound on each of the main pole portions of the rotor,
- each of the phase windings of the stator coil is configured to be supplied with harmonic current to induce field current in the field coil,
- the field coil type rotating electric machine further comprises a diode (80) and a capacitor (100),
- the diode has its cathode connected to a first-winding-side end of the serially-connected winding pair and its anode connected to a second-winding-side end of the serially-connected winding pair,
- the capacitor is connected in parallel with the first winding,
- in the field coil type rotating electric machine, there are formed both a series resonant circuit including the second winding and the capacitor and a parallel resonant circuit including the first winding and the capacitor,
- the second winding is radially located closer than the first winding to the stator, and
- a capacitance (C) of the capacitor and a turn number ratio (N2/N1), which is the ratio of the number of turns (N2) of the second winding to the number of turns (N1) of the first winding, are set to have an amplitude of a total resultant magnetic flux ($\phi$total) lower than an amplitude of a field resultant magnetic flux ($\phi$rt) when the harmonic currents are supplied to the phase windings of the stator coil, the total resultant magnetic flux being the resultant of the field resultant magnetic flux and magnetic flux ($\phi$s) generated by the harmonic currents flowing in the phase windings of the stator coil, the field resultant magnetic flux being the resultant of magnetic flux ($\phi$1) generated by harmonic current flowing in the first winding and magnetic flux ($\phi$2) generated by harmonic current flowing in the second winding.

* * * * *